(12) United States Patent
Bohlig et al.

(10) Patent No.: US 9,217,188 B2
(45) Date of Patent: Dec. 22, 2015

(54) SYSTEM AND METHOD FOR INTEGRATED WASTE STORAGE

(75) Inventors: James W. Bohlig, Rutland Town, VT (US); Douglas R. Casella, Mendon, VT (US)

(73) Assignee: ACCORDANT ENERGY, LLC, Rutland, VT (US)

( * ) Notice: Subject to any disclaimer, the term of this patent is extended or adjusted under 35 U.S.C. 154(b) by 300 days.

(21) Appl. No.: 12/491,650

(22) Filed: Jun. 25, 2009

(65) Prior Publication Data

US 2010/0038594 A1 Feb. 18, 2010

Related U.S. Application Data

(60) Provisional application No. 61/075,988, filed on Jun. 26, 2008.

(51) Int. Cl.
| | |
|---|---|
| *C22B 7/00* | (2006.01) |
| *C22B 1/24* | (2006.01) |
| *B29B 17/02* | (2006.01) |
| *B29K 23/00* | (2006.01) |
| *B29K 67/00* | (2006.01) |

(52) U.S. Cl.
CPC ............ *C22B 7/005* (2013.01); *B29B 17/02* (2013.01); *C22B 1/24* (2013.01); *B29K 2023/065* (2013.01); *B29K 2067/00* (2013.01); *Y02W 30/54* (2015.05); *Y02W 30/622* (2015.05)

(58) Field of Classification Search
None
See application file for complete search history.

(56) References Cited

U.S. PATENT DOCUMENTS

| | | | |
|---|---|---|---|
| 3,429,805 A | | 2/1969 | Karbosky |
| 3,759,036 A | * | 9/1973 | White ............................. 60/775 |
| 3,905,556 A | | 9/1975 | Drage |
| 4,052,173 A | * | 10/1977 | Schulz ............................ 48/202 |
| 4,077,847 A | | 3/1978 | Choi et al. |
| 4,153,514 A | | 5/1979 | Garrett et al. |
| 4,208,226 A | | 6/1980 | Deardorff et al. |
| 4,236,897 A | | 12/1980 | Johnston |
| 4,395,958 A | | 8/1983 | Caffyn et al. |
| 4,440,635 A | | 4/1984 | Reiniger |

(Continued)

FOREIGN PATENT DOCUMENTS

| | | |
|---|---|---|
| CN | 1915635 | 2/2007 |
| CN | 101280237 | 10/2008 |

(Continued)

OTHER PUBLICATIONS

International Search Report issued for PCT/US09/048638, mailed on Aug. 14, 2009 (2 pages).

(Continued)

*Primary Examiner* — Melvin C Mayes
*Assistant Examiner* — Sheng H Davis
(74) *Attorney, Agent, or Firm* — Cooley LLP

(57) ABSTRACT

The present invention provides integrated bunker storage systems for waste streams based on the composition and characteristics of waste streams. In particular, the present invention provides a process for generating individual waste streams based on a set of material characteristics. According to the system and method of the present invention, individual waste streams from wastes stored in bunkers are mixed in a given feed ratio to generate a feed stock that will produce a desired output from a chemical conversion process, e.g., gasification. Optionally, composition data regarding the feed stock can be certified to a third party.

27 Claims, 8 Drawing Sheets

(56) References Cited

U.S. PATENT DOCUMENTS

| | | | |
|---|---|---|---|
| 4,515,601 A | 5/1985 | Charters | |
| 4,561,860 A | 12/1985 | Gulley et al. | |
| 4,891,099 A | 1/1990 | Silveri et al. | |
| 4,913,069 A | 4/1990 | Schultz et al. | |
| 4,919,686 A * | 4/1990 | Edwards | 48/197 R |
| 5,040,972 A | 8/1991 | Gaunce et al. | |
| 5,082,525 A | 1/1992 | Travis | |
| 5,104,047 A | 4/1992 | Simmons | |
| 5,133,505 A | 7/1992 | Bourcier et al. | |
| 5,134,944 A | 8/1992 | Keller et al. | |
| 5,265,635 A | 11/1993 | Giammatteo et al. | |
| 5,288,413 A | 2/1994 | Chu | |
| 5,341,935 A | 8/1994 | Djerf et al. | |
| 5,348,163 A | 9/1994 | Tunison, III et al. | |
| 5,397,066 A | 3/1995 | Leitman et al. | |
| 5,429,645 A | 7/1995 | Benson et al. | |
| 5,660,282 A | 8/1997 | Djerf et al. | |
| 5,735,472 A | 4/1998 | Serres et al. | |
| 5,888,256 A * | 3/1999 | Morrison | 44/552 |
| 5,948,276 A | 9/1999 | Neureither et al. | |
| 5,957,295 A | 9/1999 | Neureither | |
| 5,976,435 A | 11/1999 | Djerf et al. | |
| 6,000,639 A | 12/1999 | Ganguli | |
| 6,005,149 A | 12/1999 | Bishop | |
| 6,127,645 A | 10/2000 | Titus et al. | |
| 6,182,584 B1 | 2/2001 | Gaudio | |
| 6,216,463 B1 * | 4/2001 | Stewart | 60/641.2 |
| 6,460,788 B1 | 10/2002 | de Feraudy | |
| 6,630,113 B1 | 10/2003 | Surma | |
| 6,653,517 B2 | 11/2003 | Bullock | |
| 6,655,137 B1 | 12/2003 | Sardari | |
| 6,871,603 B2 | 3/2005 | Maxwell et al. | |
| 7,169,821 B2 | 1/2007 | Branson | |
| 7,229,483 B2 | 6/2007 | Lewis | |
| 7,252,691 B2 * | 8/2007 | Philipson | 44/552 |
| 7,264,124 B2 | 9/2007 | Bohlig et al. | |
| 7,302,897 B2 | 12/2007 | Pallett et al. | |
| 7,314,002 B2 | 1/2008 | Dupuis | |
| 7,341,156 B2 | 3/2008 | Bohlig et al. | |
| 7,503,513 B2 | 3/2009 | Simon | |
| 7,803,848 B2 | 9/2010 | de Feraudy et al. | |
| 7,807,727 B2 | 10/2010 | de Feraudy et al. | |
| 8,051,986 B2 | 11/2011 | Lees | |
| 8,146,841 B2 | 4/2012 | Andela | |
| 8,157,874 B2 | 4/2012 | Bohlig et al. | |
| 8,157,875 B2 | 4/2012 | Bohlig et al. | |
| 8,459,581 B2 | 6/2013 | Bai | |
| 8,579,997 B2 | 11/2013 | Bai | |
| 8,636,235 B2 | 1/2014 | Bai | |
| 8,746,599 B2 | 6/2014 | Bai | |
| 2002/0025285 A1 | 2/2002 | Comparato et al. | |
| 2002/0195031 A1 * | 12/2002 | Walker | 110/229 |
| 2003/0178345 A1 * | 9/2003 | Hautala et al. | 209/1 |
| 2004/0103831 A1 | 6/2004 | Pope | |
| 2004/0221778 A1 * | 11/2004 | Pallett et al. | 110/342 |
| 2005/0080520 A1 * | 4/2005 | Kline et al. | 701/1 |
| 2005/0209825 A1 * | 9/2005 | Ogawa | 702/188 |
| 2006/0225422 A1 * | 10/2006 | Prentice, III | 60/645 |
| 2006/0278587 A1 * | 12/2006 | Schien et al. | 210/769 |
| 2006/0280669 A1 * | 12/2006 | Jones | 423/445 R |
| 2008/0110090 A1 | 5/2008 | Zawadzki et al. | |
| 2008/0121142 A1 | 5/2008 | Comrie et al. | |
| 2008/0290006 A1 | 11/2008 | Duffy et al. | |
| 2010/0018113 A1 | 1/2010 | Bohlig et al. | |
| 2010/0031560 A1 | 2/2010 | Calabrese et al. | |
| 2010/0038594 A1 | 2/2010 | Bohlig et al. | |
| 2010/0218419 A1 | 9/2010 | Bai | |
| 2010/0287826 A1 * | 11/2010 | Hoffman et al. | 44/605 |
| 2011/0099890 A1 | 5/2011 | Bohlig et al. | |
| 2012/0304535 A1 | 12/2012 | Bai | |
| 2012/0304536 A1 | 12/2012 | Bai | |
| 2012/0305686 A1 | 12/2012 | Bai | |
| 2012/0305688 A1 | 12/2012 | Bai | |

FOREIGN PATENT DOCUMENTS

| | | |
|---|---|---|
| CN | 101508928 | 8/2009 |
| CN | 101787315 | 7/2010 |
| CN | 102076832 | 5/2011 |
| EP | 0305782 | 3/1989 |
| EP | 0444684 | 9/1991 |
| EP | 0776962 | 6/1997 |
| EP | 1616637 | 1/2006 |
| JP | H10-310783 | 11/1998 |
| JP | 2000-140800 | 5/2000 |
| JP | 2003-268387 | 9/2003 |
| JP | 2004-239515 | 8/2004 |
| WO | WO 2009/158486 | 12/2009 |
| WO | WO 2009/158540 | 12/2009 |
| WO | WO 2012/167070 | 12/2012 |

OTHER PUBLICATIONS

Extended European Search Report issued for European Patent Application No. 09771018.0, mailed Apr. 16, 2012, 5 pages.
International Preliminary Report on Patentability for International Application No. PCT/US2009/048638, issued Jan. 5, 2011, 8 pages.
International Search Report and Written Opinion for International Application No. PCT/US2013/23498, mailed Jul. 10, 2013, 13 pages.
International Search Report and Written Opinion for International Application No. PCT/US2012/040447, mailed Aug. 17, 2012, 10 pages.
International Preliminary Report on Patentability for International Application No. PCT/US2012/040447, mailed Dec. 4, 2013, 7 pages.
Biobib a Data Base for Biofuels online (http://www.vt.tuwien.ac.at/biobib/biobib.html), (2007), 12 pages.
Elemental Content Phyllis Database at http://www.ecn.nl/phyllis/dataTable.asp, (undated), 5 pages.

* cited by examiner

SYSTEM AND METHOD FOR INTEGRATED WASTE STORAGE

CROSS REFERENCE TO RELATED APPLICATIONS

This application claims the benefit under 35 U.S.C. §119(e) of U.S. Provisional Patent Application No. 61/075,988, filed on Jun. 26, 2008, entitled System And Method For Integrated Waste Storage, which is herein incorporated by reference in its entirety.

FIELD OF THE INVENTION

The present invention generally relates to alternative energy, fuels, and petrochemicals. More particularly, the present invention is concerned with the recovery of energy and/or raw materials from waste materials stored in an integrated bunker storage system, and provides a process for generating feed stock from the waste streams for optimum conversion to energy, fuel, or petrochemicals.

BACKGROUND OF THE INVENTION

Sources of fuel useful for heating, transportation, and the production of petrochemicals are becoming increasingly scarce and therefore more costly. Industries such as those producing energy and petrochemicals are actively searching for cost effective fuel feed stock alternatives for use in generating those products and many others. Additionally, due to the ever increasing costs of fossil fuels, transportation costs for moving fuel feed stocks for production of energy and petrochemicals is rapidly escalating.

These energy and petrochemical producing industries, and others, normally have relied on the use of fossil fuels, such as coal, oil and/or natural gas, for use in combustion and gasification processes for the production of energy for heating and electricity, and the generation of synthesis gas used for the downstream production of petrochemicals and liquid fuels.

Combustion and gasification are thermochemical processes that are used to release the energy stored within the fuel source. Combustion takes place in a reactor in the presence of excess air, or an excess of oxygen. Combustion is generally used for generating steam which in turn is used to generate electricity through steam turbines. However, the brute force nature of complete combustion of fuel causes significant amounts of pollutants to be generated in the gas given off during combustion. For example, combustion in an oxidizing atmosphere of, for example, coal releases nitrogen oxides, a precursor to ground level ozone which can stimulate asthma attacks. Combustion of high sulfur containing fossil fuels, such as coal, is also the largest source of sulfur dioxide which in turn produces sulfates that are very fine particulates. Fine particle pollution from U.S. power plants cuts short the lives of over 30,000 people each year. Hundreds of thousands of Americans suffer from asthma attacks, cardiac problems and upper and lower respiratory problems associated with fine particles from power plants.

Gasification also takes place in a reactor, although in the absence of air, or in the presence of substochiometric amounts of oxygen. The thermochemical reactions that take place in the absence of oxygen or under substochiometric amounts of oxygen do not result in the formation of nitrogen oxides or sulfur oxides.

Gasification generates a gaseous fuel rich product. During gasification, two processes take place that convert the fuel source into a useable fuel gas. In the first stage, pyrolysis or flaming pyrolysis, the feed stock releases volatile components of the fuel at temperatures below 600° C. (1112° F.); a process known as devolatization. The by-product of pyrolysis that is not vaporized is called char and consists mainly of fixed carbon and ash. In the second gasification stage, the carbon remaining after pyrolysis undergoes a reduction processes by reacting either with steam and/or hydrogen. Gasification with pure oxygen results in a high quality mixture of carbon monoxide and hydrogen and virtually no nitrogen.

The basic gasification reactions that occur are:
1) $C+\frac{1}{2}O_2 \rightarrow CO-110.5$ kJ/mol (exothermic)
2) $C+H_2O \rightarrow CO+H_2+131$ kJ/mol (endothermic)
3) $C+CO_2 \rightarrow 2CO+172$ kJ/mol (endothermic)
4) $C+2H_2 \rightarrow CH_4-74$ kJ/mol (exothermic)
5) $CO+ \rightarrow CO_2+H_2-41$ kJ/mol (exothermic)$H_2O$
6) $CO+3H_2 \rightarrow CH_4+H_2O-205$ kJ/mol (exothermic)

All of these reactions are reversible and their rates depend on the reaction kinetics, which are functions of temperature, pressure and concentration reactants in the reactor. Heat can be supplied directly or indirectly to satisfy the requirements of the endothermic reactions.

A variety of gasifier types have been developed. They can be grouped into four major classifications: fixed-bed updraft, fixed-bed downdraft, bubbling fluidized-bed and circulating fluidized bed. Differentiation is based on the means of supporting the fuel source in the reactor vessel, the direction of flow of both the fuel and oxidant, and the way heat is supplied to the reactor.

The updraft gasifier, also known as counterflow gasification, is the oldest and simplest form of gasifier; it is still used for coal gasification. The fuel is introduced at the top of the reactor, and a grate at the bottom of the reactor supports the reacting bed. The oxidant in the form of air or oxygen and/or steam are introduced below the grate and flow up through the bed of fuel and char. In an ideal gasifier, complete conversion of char would occur at the bottom of the bed, liberating $CO_2$ and $H_2O$. These hot gases (~1000° C.) pass through the bed above, where they are reduced to $H_2$ and CO and cooled to 750° C. Continuing up the reactor, the reducing gases ($H_2$ and CO) pyrolyse the descending dry fuel and finally dry any incoming wet fuel, leaving the reactor at a low temperature (~500° C.). The advantages of updraft gasification are: simple, higher thermal efficiency, low cost process that is able to handle fuel with a high moisture and high inorganic content. The primary disadvantage of updraft gasification is that the synthesis gas contains 10-20% tar by weight, requiring extensive syngas cleanup before engine, turbine or synthesis applications.

The downdraft gasification, also known as cocurrent-flow gasification, has the same mechanical configuration as the updraft gasifier except that the oxidant and product gases flow down the reactor, in the same direction as the fuel. A major difference is that this process can crack up to 99.9% of the tars formed. Low moisture fuel (<20%) and air or oxygen are ignited in the reaction zone at the top of the reactor. The flame generates pyrolysis gas/vapor, which burns intensely leaving 5 to 15% char and hot gas. These gases flow downward and react with the char at 800 to 1200° C., generating more CO and $H_2$ while being cooled to below 800° C. Finally, unconverted char and ash pass through the bottom of the grate and are sent to disposal. The advantages of downdraft gasification are: up to 99.9% of the tar formed is consumed, requiring minimal or no tar cleanup Minerals remain with the char/ash, reducing the need for a cyclone. The disadvantages of downdraft gasification are: requires feed drying to a low moisture content (<20%). The syngas exiting the reactor is at high temperature, requiring a secondary heat recovery system; and 4-7% of the carbon remains unconverted.

The bubbling fluidized bed consists of fine, inert particles of sand or alumina, which have been selected for size, density, and thermal characteristics. As gas (oxygen, air or steam) is forced through the bed of particles, a point is reached when the frictional force between the particles and the gas counterbalances the weight of the solids. At this gas velocity (called minimum fluidization velocity), bubbling and channeling of gas through the media may occur, such that the particles remain in the reactor and appear to be in a "boiling state". The fluidized particles tend to break up the biomass fed to the bed and ensure good heat transfer throughout the reactor. The advantages of bubbling fluidized-bed gasification are: yields a uniform product gas; exhibits a nearly uniform temperature distribution throughout the reactor; able to accept a wide range of fuel particle sizes, including fines; provides high rates of heat transfer between inert material, fuel and gas; high conversion possible with low tar and unconverted carbon. The disadvantages of bubbling fluidized-bed gasification are: lower gas-solid contact efficiency due to formation of bubbles, and increased attrition and dust entrainment rates large bubble size may result in gas bypass through the bed.

The circulating fluidized bed gasifiers operate at gas velocities higher than the so-called transport velocity, resulting in significant entrainment of the particles in the gas stream. Thus the entrained particles in the gas exited from the top of the reactor must be-separated in a cyclone and returned to the reactor. The advantages of circulating fluidized-bed gasification are: it is suitable for rapid reactions; high heat transport rates possible due to high heat capacity of bed material; high conversion rates possible with low tar and unconverted carbon. It also makes production of higher energy content syngas possible because heat required for gasification can be transferred from outside through circulating particles acting as heat carriers. The disadvantages of circulating fluidized-bed gasification are: temperature gradients occur in the direction of solid flow; smaller particles are required; high velocities may result in equipment erosion; and heat exchange is less efficient than bubbling fluidized-bed.

Normally these gasifiers use a homogeneous source of fuel because a constant unchanging fuel source allows the gasifier to be designed optimally for this particular fuel, for production of a desired product. Common types of fuel used today in gasifiers are wood, coal, petroleum, and, biomass. Since some of these fuel sources are becoming increasingly more expensive, energy and petrochemical suppliers are seeking alternative fuel feed stocks.

One potential source of a large amount of feed stock for gasification is waste. Waste such as municipal solid waste is presently often disposed of or used in incineration processes to generate heat and/or steam for use in -turbines. Incineration is a combustion process and the negative drawbacks for combustion have been described above.

One of the most significant threats facing the environment today is the release of greenhouse gases (GHGs) into the atmosphere. GHGs such as carbon dioxide, methane, nitrous oxide, water vapor, carbon monoxide, nitrogen oxide, nitrogen dioxide, and ozone, absorb heat from incoming solar radiation but do not allow long-wave radiation to reflect back into space. GHGs in the atmosphere result in the trapping of absorbed heat and warming of the earth's surface. In the U.S., GHG emissions come mostly from energy use driven largely by economic growth, fuel used for electricity generation, and weather patterns affecting heating and cooling needs. Energy-related carbon dioxide emissions, resulting from petroleum and natural gas, represent 82 percent of total U.S. human-made GHG emissions. Another greenhouse gas, methane, comes from landfills, coal mines, oil and gas operations, and agriculture; it represents nine percent of total emissions. Nitrous oxide (5 percent of total emissions), meanwhile, is emitted from burning fossil fuels and through the use of certain fertilizers and industrial processes. World carbon dioxide emissions are expected to increase by 1.9 percent annually between 2001 and 2025. Much of the increase in these emissions is expected to occur in the developing world where emerging economies, such as China and India, fuel economic development with fossil energy. Developing countries' emissions are expected to grow above the world average at 2.7 percent annually between 2001 and 2025; and surpass emissions of industrialized countries near 2018.

Landfills can also be significant sources of GHG emissions if no or poor landfill gas connection system is in place, mostly because of methane released during decomposition of waste, such as, for example, municipal solid waste (MSW). Compared with carbon dioxide, methane is twenty-one times stronger than carbon dioxide as a GHG. Today, landfills are responsible for about 4% of the anthropogenic emissions. Considerable reductions in methane emissions can be achieved by combustion of waste and by collecting methane from landfills. The methane collected from the landfill can either be used directly in energy production or flared off, i.e., eliminated through combustion without energy production. *Combustion Of Waste May Reduce Greenhouse Gas Emissions*, Science Daily (Dec. 8, 2007).

One measure of the impact human activities have on the environment in terms of the amount of green house gases produced is the carbon footprint, measured in units of carbon dioxide ($CO_2$). The carbon footprint can be seen as the total amount of carbon dioxide and other GHGs emitted over the full life cycle of a product or service. Normally, a carbon footprint is usually expressed as a $CO_2$ equivalent (usually in kilograms or tons), which accounts for the same global warming effects of different GHGs. Carbon footprints can be calculated using a Life Cycle Assessment method, or can be restricted to the immediately attributable emissions from energy use of fossil fuels.

An alternative definition of carbon footprint is the total amount of $CO_2$ attributable to the actions of an individual (mainly through their energy use) over a period of one year. This definition underlies the personal carbon calculators. The term owes its origins to the idea that a footprint is what has been left behind as a result of the individual's activities. Carbon footprints can either consider only direct emissions (typically from energy used in the home and in transport, including travel by cars, airplanes, rail and other public transport), or can also include indirect emissions which include $CO_2$ emissions as a result of goods and services consumed, along with the concomitant waste produced.

The carbon footprint can be efficiently and effectively reduced by applying the following steps: (i) life cycle assessment to accurately determine the current carbon footprint; (ii) identification of hot-spots in terms of energy consumption and associated $CO_2$-emissions; (iii) optimization of energy efficiency and, thus, reduction of $CO_2$-emissions and reduction of other GHG emissions contributed from production processes; and (iv) identification of solutions to neutralize the $CO_2$ emissions that cannot be eliminated by energy saving measures. The last step includes carbon offsetting, and investment in projects that aim at the reducing $CO_2$ emissions.

The purchase of carbon offsets is another way to reduce a carbon footprint. One carbon offset represents the reduction of one ton of $CO_2$-eq. Companies that sell carbon offsets invest in projects such as renewable energy research, agricultural and landfill gas capture, and tree-planting.

Purchase and withdrawal of emissions trading credits also occurs, which creates a connection between the voluntary and regulated carbon markets. Emissions trading schemes provide a financial incentive for organizations and corporations to reduce their carbon footprint. Such schemes exist under cap-and-trade systems, where the total carbon emissions for a particular country, region, or sector are capped at a certain value, and organizations are issued permits to emit a fraction of the total emissions. Organizations that emit less carbon than their emission target can then sell their "excess" carbon emissions.

For many wastes, the disposed materials represent what is left over after a long series of steps including: (i) extraction and processing of raw materials; (ii) manufacture of products; (iii) transportation of materials and products to markets; (iv) use by consumers; and (v) waste management. At virtually every step along this "life cycle," the potential exists for GHG impacts. Waste management affects GHGs by affecting energy consumption (specifically, combustion of fossil fuels) associated with making, transporting, using, and disposing the product or material that becomes a waste and emissions from the waste in landfills where the waste is disposed.

Traditionally, attempts have been made to use various types of incineration as means for reducing the amount, or volume, of materials which must be disposed of in landfills. However, only few have provided economically affordable improvements or effective solutions to the solid waste problems. Of course, incineration, although reducing the volume of wastes disposed of in landfills, creates a large GHG emission and thereby the carbon foot print of the disposed of product, now waste, is not decreased. Various attempts have been made to utilize solid wastes directly, blended with other solid/liquid fuels, or after some form of processing, as fuels for electric power generation. While some projects have proven technically feasible, only a few have proven to be either environmentally desirable or economically attractive. Most waste energy recovery projects cost the municipalities more than the original landfills they replace, and do not represent substantial environmental improvements.

Incineration typically reduces the volume of the MSW by about 90% with the remaining 10% of the volume of the original MSW often being landfilled. This incineration process produces large quantities of the GHG $CO_2$. Typically, the joules of energy produced per equivalents $CO_2$ expelled during incineration are very low. Thus, incineration of MSW for energy production releases GHG into the atmosphere with comparatively little energy return. Therefore, if GHGs are to be avoided, new solutions for the disposal of wastes, such as MSW, other than landfilling and incineration, are needed.

Each material disposed of as waste has a different GHG impact depending on how it is made and disposed. The most important GHGs for waste management options are carbon dioxide, methane, nitrous oxide, and perfluorocarbons. Of these, carbon dioxide ($CO_2$) is by far the most common GHG emitted in the US. Most carbon dioxide emissions result from energy use, particularly fossil fuel combustion. Carbon dioxide is the reference gas for measurement of the heat-trapping potential (also known as global warming potential or GWP). By definition, the GWP of one kilogram (kg) of carbon dioxide is 1. Methane has a GWP of 21, meaning that one kg of methane has the same heat-trapping potential as 21 kg of CO2. Nitrous oxide has a GWP of 310. Perfluorocarbons are the most potent GHGs with GWPs of 6,500 for $CF_4$ and 9,200 for $C_2F_6$. Emissions of carbon dioxide, methane, nitrous oxide, and perfluorocarbons are usually expressed in "carbon equivalents." Because $CO_2$ is 12/44 carbon by weight, one metric ton of $CO_2$ is equal to 12/44 or 0.27 metric tons of carbon equivalent (MTCE). The MTCE value for one metric ton of each of the other gases is determined by multiplying its GWP by a factor of 12/44 (The Intergovernmental Panel on Climate Change (IPCC), *Climate Change* 1995: *The Science of Climate Change,* 1996, p. 121). Methane ($CH_4$), a more potent GHG, is produced when organic waste decomposes in an oxygen free (anaerobic) environment, such as a landfill. Methane from landfills is the largest source of methane in the US.

Treatment methods for biodegradable waste—composting and digestion reduce the GHG emissions compared with landfilling. Biogas production in a digestion plant yields more emission reductions than composting, if the biogas can be utilized for production of heat, electricity, or transportation fuel. The efficiency is even better if the separation of waste components takes place already at the source and if fossil fuels are replaced by biogas.

The greater GHG emission reductions are usually obtained when recycled waste materials are processed and used to replace fossil fuels. If the replaced material is biotic (material derived from living organisms), it is not always possible to obtain reductions of emissions. Even other factors, such as the treatment of the waste material and the fate of the products after the use, affect the emission balance. For example, the recycling of oil-absorbing sheets made of recycled textiles lead to emission reductions compared with the use of virgin plastic. In another example, the use of recycled plastic as raw material for construction material was found to be better than the use of impregnated wood. This is because the combustion of plastic causes more emissions than impregnated wood for reducing emissions. If the replaced material had been fossil fuel-based, or concrete, or steel, the result would probably have been more favorable to the recycling of plastic.

Given the effect of GHGs on the environment, different levels of government are considering, and in some instances have initiated, programs aimed at reducing the GHGs released into the atmosphere during the conversion of fuels into energy. One such initiative is the Regional Greenhouse Gas Initiative (RGGI). RGGI is a market-based program designed to reduce global warming pollution from electric power plants in the Northeast. Other such initiatives are being considered in different sections of the U.S. and on the federal level. RGGI is a government mandated GHG trading system in the Northeastern U.S. This program will require, for example, that coal-fired power plants aggressively reduce their GHG emissions by on average 2.5% per year. One way to do this is by changing the fuel source used or scrubbing the emissions to remove the pollutants. An alternative is to purchase carbon credits generated by others which can offset their emissions into the atmosphere.

Thus, there is a need for alternative fuels that burn efficiently and cleanly and that can be used for the production of energy and/or raw materials for the production of petrochemicals. There is, at the same time, a need for waste management systems that implement methods for reducing GHG emissions of waste. In particular, there is a need for reducing the carbon foot print of materials by affecting their end-stage life cycle management. By harnessing and using the energy content contained in waste, it is possible to reduce GHG emissions generated during the processing of wastes and effectively use the waste generated by commercial and residential consumers.

It is therefore an object of this invention to provide an improved and economical process for the disposal of domestic waste by recovering the energy and matter bound within it and reducing the need for fossil fuels. It is a further object of this invention to provide an improved feed stock for the control of the output from processes for the production of energy and/or production of raw materials for petrochemical production. It is another object of this invention to provide an improved feed stock for thermal-conversion of carbon-containing materials to obviate the disadvantages of prior art systems.

It is also an object of this invention to provide an integrated bunker storage system for waste streams based on physical and/or chemical properties of waste that, when subject to chemical conversion, effect the output from processes for the production of energy and/or production of raw materials for petrochemical production. It is another object of this invention to provide an integrated bunker storage system for waste streams based on the chemical content of the waste and based on the use of the waste as components for a blended feed stock in a chemical conversion process. It is yet a further object of this invention to provide an integrated bunker storage system for waste streams based on the energy content of waste streams. It is a further object of this invention to provide a process for storing waste streams based on the desired energy content in feed streams necessary to achieve optimum thermal-conversion.

SUMMARY OF THE INVENTION

The present invention provides integrated bunker storage systems for waste streams based on the composition and characteristics of waste streams. In particular, the present invention provides a process for generating individual waste streams based on a set of material characteristics. According to the system and method of the present invention, individual waste streams from wastes stored in bunkers are mixed in a given feed ratio to generate a feed stock that will produce a desired output from a chemical conversion process, e.g., gasification.

Under one aspect of the invention, a systems includes a first bunker of waste constituents of a first type separated from a mixed municipal solid waste stream and a second bunker of waste constituents of a second type separated from the mixed municipal solid waste stream. The waste constituents of the first type are differentiated from the waste constituents of the second type based on the chemical composition of the waste constituents. The waste types are also differentiated based on how a blended feed stock comprising a combination of the waste constituents from the first and second bunkers affects at least one of (i) a hydrogen to carbon monoxide gas production ratio and (ii) a total quantity of hydrogen and carbon monoxide produced by a gasification process when said blended feed stock is converted in said gasification process.

Under another aspect of the invention, a system includes a first bunker of waste constituents of a first type separated from a solid waste stream and a second bunker of waste constituents of a second type separated from the solid waste stream. The waste constituents of the first type are differentiated from the waste constituents of the second type based on at least one of physical characteristics and chemical characteristics of the waste constituents. The waste types are also differentiated based on how a blended feed stock comprising a combination of the waste constituents from the first and second bunkers affects an output of a chemical conversion process when said blended feed stock is converted in said chemical conversion process.

Under a further aspect of the invention, the solid waste stream comprises mixed municipal solid waste. Under still another aspect of the invention, the solid waste stream comprises a source segregated stream. Optionally, the source segregated stream can comprise recyclable materials, and the source segregated stream can comprise recycling residue.

Under yet another aspect of the invention, the waste constituents of the first type comprise materials including one of high density polyethylene, low density polyethylene, polyethylene terepthalate, fibers, paper, newsprint, wood, and fats, oils, and greases (FOGs). Likewise, the waste constituents of the second type can differ from that of the first type and comprise materials including one of high density polyethylene, low density polyethylene, polyethylene terepthalate, fibers, paper, newsprint, wood, and fats, oils, and greases (FOGs).

Under an aspect of the invention, the waste constituents of the first type are differentiated from the waste constituents of the second type based on at least one of the carbon, hydrogen, oxygen, sulfur, nitrogen, chlorine, and ash content of the waste constituents. Under another aspect of the invention, the waste constituents of the first type are differentiated from the waste constituents of the second type based on the moisture content of the waste constituents.

Under a further aspect of the invention, a method includes providing a first and second bunker and differentiating between mixed solid waste constituents of a first type and a second type based on at least one of physical characteristics and chemical characteristics of the waste constituents and based on how the waste constituents affect an output of a chemical conversion process when the waste constituents of the first and second types are combined into a blended feed stock for conversion in the chemical conversion process. The method also includes placing the waste constituents of the first type into the first bunker and placing the waste constituents of the second type into the second bunker.

Under still another aspect of the invention, the method includes blending waste constituents of the first type with waste constituents of the second type to form the blended feed stock. Optionally, the method can include densifying the blended feed stock.

Under an aspect of the invention, a method of producing an engineered feed stock of a desired chemical composition includes providing a first bunker of waste constituents of a first type separated from a mixed solid waste stream and providing a second bunker of waste constituents of a second type separated from the mixed solid waste stream. The method also includes determining a chemical composition of the waste constituents of the first bunker and determining a chemical composition of the waste constituents of the second bunker. The method further includes determining a quantitative ratio between the waste constituents of the first bunker and the waste constituents of the second bunkers that, when the waste constituents are combined in the quantitative ratio, provides the engineered feed stock of the desired chemical composition. The method also include mixing the waste constituents of the first bunker and the second bunker according to the quantitative ratio to provide the engineered feed stock of the desired chemical composition.

Under a further aspect of the invention, at least one of determining a chemical composition of the waste constituents of the first bunker and determining a chemical composition of the waste constituents of the second bunker is based on a collection of chemical composition information associated with waste types commonly occurring in the municipal solid waste stream. Optionally, the collection of chemical composition information associated with waste types commonly occurring in the municipal solid waste stream can be a lookup table.

Under another aspect of the invention, optical sorters collect data pertaining to at least one of a volume and a weight of the waste constituents in at least one of the bunkers and/or mixed into a blended feed stock. Optionally, this data can be certified to a third party.

DETAILED DESCRIPTION

Gasification is a thermochemical process that generates a gaseous, fuel rich product. Regardless of how the gasifier is designed, two processes must take place in order to produce a useable fuel gas. In the first stage, pyrolysis releases the volatile components of the fuel at temperatures below 600° C. (1112° F.). The by-product of pyrolysis that is not vaporized, typically called char, consists mainly of fixed carbon and ash. In the second gasification stage, the carbon remaining after pyrolysis is either reacted with steam, hydrogen, air, or pure oxygen. Gasification with air results in a nitrogen-rich, low energy content fuel gas. Gasification with pure oxygen results in a higher quality mixture of carbon monoxide and hydrogen and virtually no nitrogen. Gasification with steam is more commonly called "reforming" and results in a hydrogen and carbon dioxide rich "synthesis" gas (syngas). Typically, the exothermic reaction between carbon and oxygen provides the heat energy required to drive the pyrolysis and char gasification reactions.

The basic gasification reactions that must be considered include:
1) $C + \frac{1}{2}O_2 \rightarrow CO - 110.5$ kJ/mol (exothermic)
2) $C + H_2O \rightarrow CO + H_2 + 131$ kJ/mol (endothermic)
3) $C + CO_2 \rightarrow 2CO + 172$ kJ/mol (endothermic)
4) $C + 2H_2 \rightarrow CH_4 - 74$ kJ/mol (exothermic)
5) $CO + H_2O \rightarrow CO_2 + H_2 - 41$ kJ/mol (exothermic)
6) $CO + 3H_2 \rightarrow CH_4 + H_2O - 205$ kJ/mol (exothermic)

All of these reactions are reversible and their rates depend on reaction kinetics, which are functions of temperature, pressure and concentration of reactants in the reactor. A potential source of feed stock for producing syngas via gasification is waste. Gasification process devolatilizes and gasifies solid or liquid hydrocarbons in waste, and converts them into a low or medium energy content gas. Gasification has several advantages over traditional combustion of waste. It takes place in a reducing environment that limits the formation of dioxins and of $SO_X$ and $NO_X$. Furthermore, it requires just a fraction of the stoichiometric amount of oxygen necessary for combustion. As a result, the volume of process gas is low, requiring smaller and less expensive gas cleaning equipment, and heat exchanger devices. The lower gas volume also means a higher partial pressure of contaminants in the off-gas, which favors more complete adsorption and particulate capture according to chemical thermodynamics: $\Delta G = -RT \ln(P_1/P_0)$. Finally, gasification generates a fuel gas that can be integrated with combined cycle turbines, reciprocating engines and, potentially, with fuel cells that convert fuel energy to electricity more efficiently than conventional steam boilers.

Figure 1A:
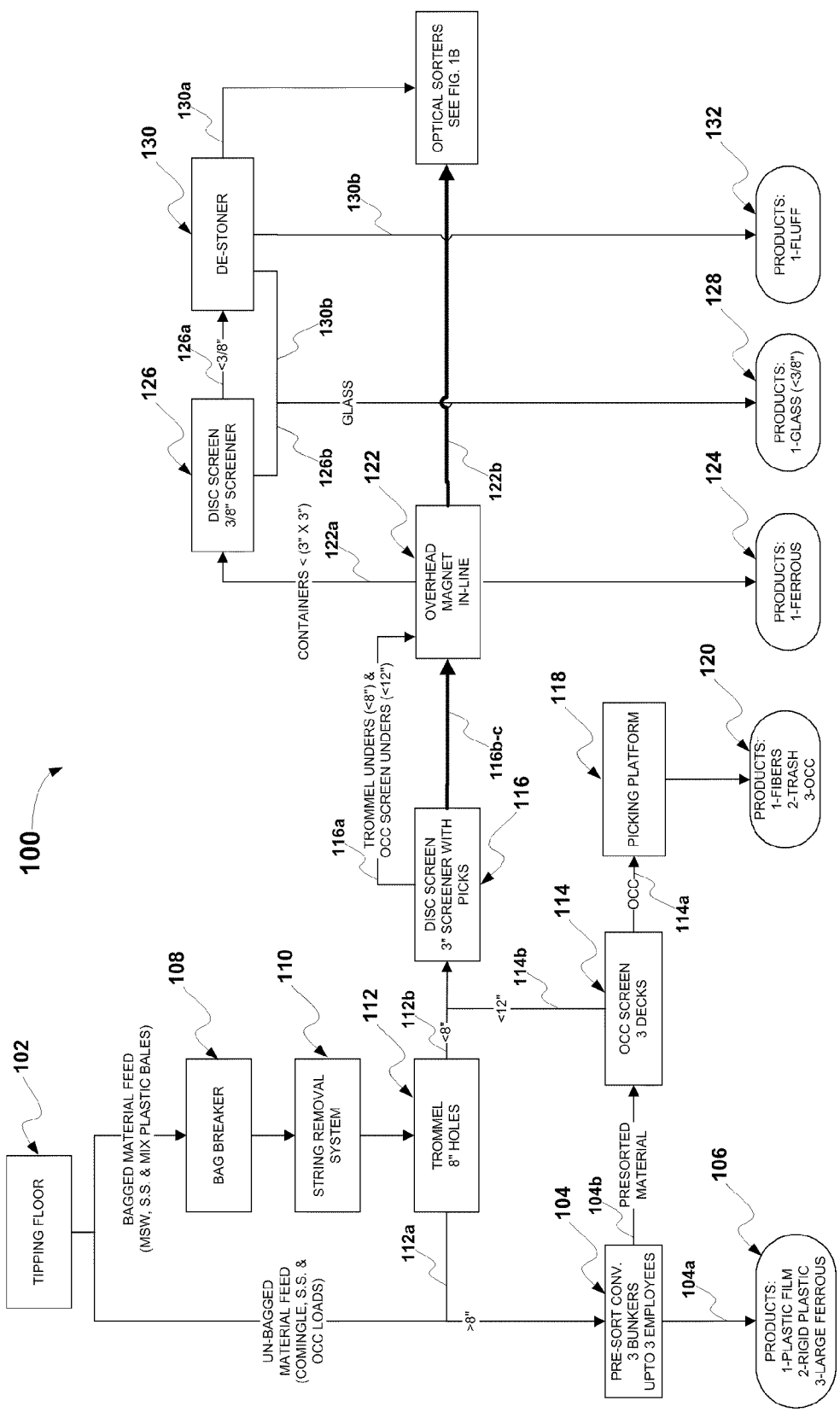
FIG. 1a and FIG. 1b show an exemplary process for separating and sorting waste material.
Figure 1B:
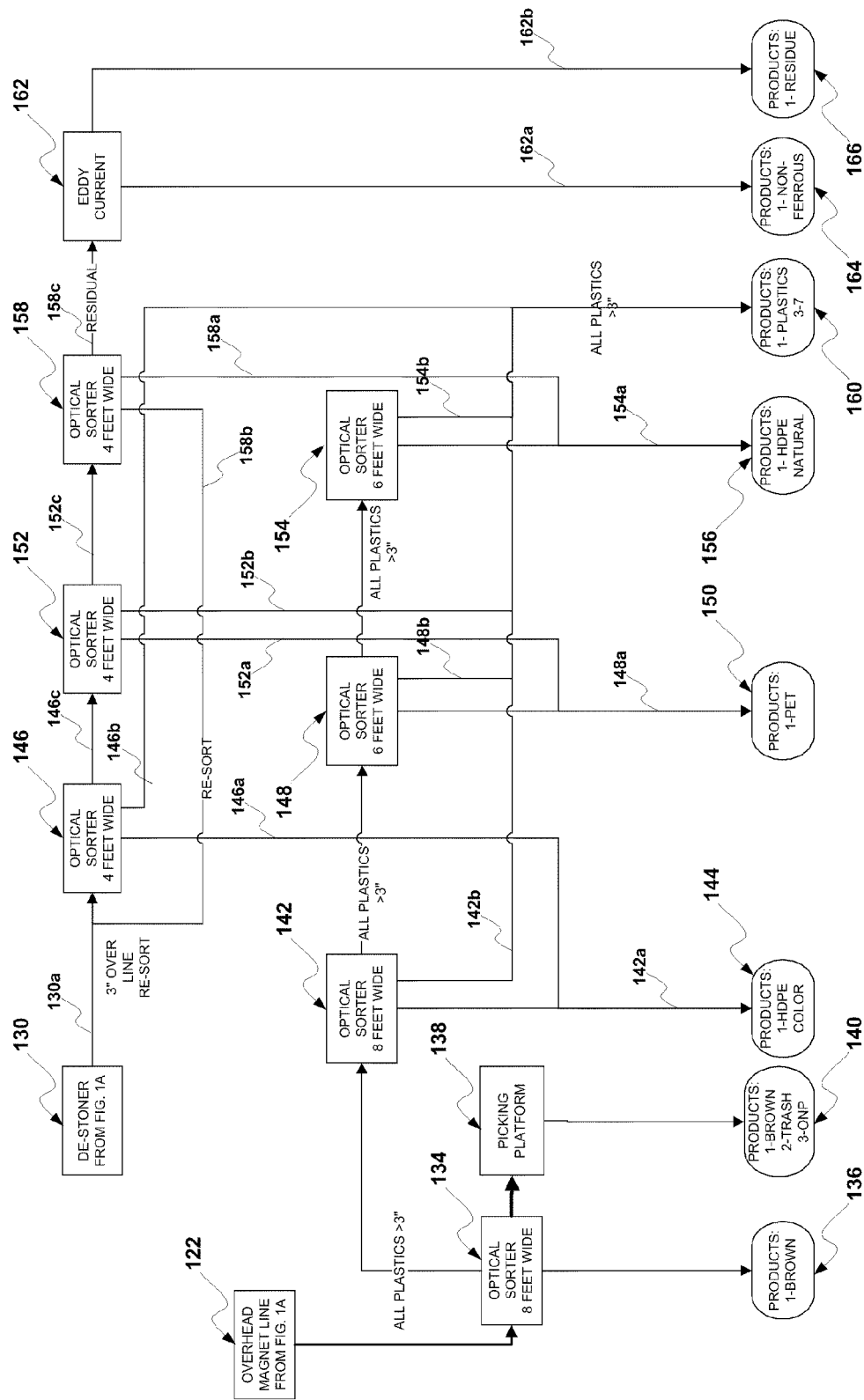

Referring now to the drawings, and more particularly, to FIG. 1a and FIG. 1b, generally at 100, there is shown an exemplary process for separating and sorting waste material to be used as feed stock for engineered fuels. The waste materials can be, for example, a mixed MSW stream, a source segregated stream (e.g., a stream of recyclable materials segregated from non-recyclable materials at the waste source), and/or a recycling stream residue, that is, a stream of materials remaining after some quantity of recyclable materials has been removed from a waste stream. Waste materials are brought into a large reception area by waste collection vehicles as either single stream or as multiple streams. The waste streams may be bagged, unbagged, or construction and demolition (C&D) stream. Unbagged waste materials include, for example, commingled waste material, single stream waste material and old corrugated cardboards (OCC). Waste materials are dumped on a tipping floor 102 and are then pushed onto a conveyor by a payloader. In one embodiment, unbagged waste materials are presorted by customers. In another embodiment, unbagged waste materials are pre-sorted by collection service at customer sites. From tipping floor 102, unbagged waste materials are transferred to pre-sorting station 104 by the conveyor. Presorting station 104 sorts the unbagged waste material into large ferrous, large plastic (e.g., large hard plastics), and plastic film substreams. Each of the substreams from presorting station 104 is further subdivided into two streams 104a and 104b. Clean and sorted waste materials from presorting station 104 are included in first stream 104a, and are then transferred to bunker 106. In one embodiment, bunkers 106 may include compartments designated for each of the material in the first stream 104a.

Sorted waste materials, including contaminants, from pre-sorting station 104 are diverted as second stream 104b to OCC screen 114. OCC screen 114 screens out, for example, paper, bags, and corrugated fiber from stream 104b. In one aspect of the present invention, OCC screen 114 is an OCC disc screen, which includes multiple discs that rotate and impart, for example, a wavelike motion that causes larger object such as OCC to move upwards, away from the remainder of stream 104b. In some embodiments, OCC screen 114 will be utilized to remove mixed and office paper from OCC. OCC screen 114 can utilize, for example, serrated elliptical disks made out of ½-inch thick steel plate. The size of the disks can be changed, and the space between disks or rows of disks can be varied to adapt to the stream of waste materials. In one embodiment, OCC screen 114 includes three decks for removing OCC fibers, non-OCC fibers, and containers that are sized at about 8 inches by 12 inches. Negatively sorted OCC stream 114a from OCC screen 114 are transferred to picking platform 118, where fiber shreds and trash are removed from OCC stream 114a. Fiber shreds, trash, and OCC from picking platform 118 are then transferred to bunkers 120.

If the waste from tipping floor comprises bagged waste materials, the conveyor carries the bagged waste materials for bag breaking/splitting. Before transferring the material for bag splitting, the material may be weighed using a scale. A bag splitter 108 tears the bags open and transfers the waste material to other units in the process for separation and sorting. Each unit in the process removes a particular type of material from the waste materials.

First, the material from bag breaker 108 are transferred to a stringer screening unit 110. The stringer screening unit 110 removes long strands (e.g., threads, strings, wires, tapes, ropes, etc.) that could damage downstream equipment. After removing strings, waste materials are transferred to trommel 112, where oversized materials are removed to prevent damage of downstream sorting equipment. A trommel is a rotating cylindrical screen that is inclined at a downward angle from a horizontal axis. For example, the cylindrical screen may include 8 inch holes, which allows material that are less than 8 inches to fall through while retaining material larger than 8 inches within the cylinder. Material is fed into a trommel at the elevated end, and separation occurs while the material moves down the drum. The tumbling action of the trommel separates materials that may be attached to each other. In one embodiment of the present invention, sorting process may be rearranged such that bagged waste materials are directly fed into a trommel with picks. Trommel picks may be attached to the insides of the cylindrical screen, and may be used to gently open bags and then disperse the material without resizing the material. Sorted waste materials from the trommel are then passed through a stringer unit to remove the strings from the waste materials.

Negatively sorted stream 112a (e.g., trommel overs greater than 8 inches) from trommel screen 112 are mixed with unbagged waste materials from tipping floor 102, and then provided as input to presorting station 104. For example, negatively sorted stream 112a may include materials that are greater than 8 inches and have high fiber content. Positively sorted stream 112a (e.g., trommel unders greater than 8 inches) from trommel screen 112 are mixed with positively sorted stream 114b (e.g., OCC screen unders) from OCC screen 114, and then provided as input to disc screen 116. Although not shown, an additional picking platform can be provided after trommel screen 112 to remove waste items that are problematic, or that can not be otherwise processed by process 100.

Disc screen 116 sorts containers from fibers in input stream 114b, and divides the sorted material into output streams 116a-c. In one embodiment, disc screen 116 is similar to OCC screen 114 but with smaller gaps between the discs. For example, disc screen 116 may include discs with gaps between them to allow container sizes smaller than about 2.5 inches by 3 inches to fall through. In other embodiments, systems such as those disclosed in U.S. Provisional Patent Application No. 61/098,525, filed Sep. 19, 2008, entitled System And Method For Sorting Of Mixed Materials Using Air Currents, incorporated by reference herein, are used to sort containers from fibers or further separate paper and/or fibers from other materials. Specifically, air jets can be placed beneath OCC screen 114 to remove paper and/or fibers from the balance of the stream. Output stream 116a from disc screen and/or other container/fiber separation devices is provided as input to overhead magnet line 122. Output stream 116a may include trommel unders, OCC screen unders, majority of glass materials, and containers that fall through the gaps between the discs in disc screen 116.

Positively sorted output stream 116a is provided as input to overhead magnet line 122 to separate ferrous metals from output stream 116a. Negatively sorted materials may be further divided into dual line output streams 116b-c is also provided as input to overhead magnet line 122 to separate ferrous metals from output stream 116b. Output streams 116a-c reduce burden depth, increase recovery, and reduce contamination levels. Overhead magnet line 122 includes a belt magnet suspended above a conveyor to pick up ferrous materials and transfer them onto a conveyor which deposits the ferrous material to a ferrous storage bunker 124. Remaining waste stream of nonferrous material from overhead magnet line 122 is split into substreams 122a-b.

First substream 122a may comprise bulk light materials, predominantly broken particles of glass, and plastics and non-ferrous containers of size less than about 3 inches by 3 inches. Substream 122a is provided as input to disc screen 126 to break and separate glass from plastics. In one embodiment, disc screen 126 separates particles less than ⅜ inches from the substream 122a. Separated glass particles from disc screen 126 are stored in bunker 128. Disc screen overs 126a comprising predominantly plastics, and small amounts of glass and airborne enabled material are provided as input to de-stoner 130 (e.g., vibrating air classifier) for separating more dense material such as glass and the airborne enabled material from the plastics. The waste material travels across a vibrating screen of de-stoner 130 and denser material such as the glass and the airborne enabled material fall through openings in the screen while the remaining lighter material are maintained above the screen by air supplied from a fan. Output stream 130b comprising separated glass from de-stoner 130 are mixed with glass particles in output stream 126b, and then transported to storage bunker 128. Output stream 130c comprising separated airborne enabled material fall from de-stoner 130 are transported to storage bunker 132. Remaining output stream 130a from de-stoner 130 are provided as input to optical sorter 146 (FIG. 1b).

Second substream 122b, comprising predominantly fiber and reduced levels of plastics, is provided as input to optical sorter 134. Optical sorter 134 is used to remove all plastics from fiber browns. Optical sorter 134 shines light onto the conveyor, and a sensor detects the reflected light from plastic materials. Using this information, the sensor locates the plastic material, targets a jet of air to hit the plastic material at the location, and removes it from the conveyor. In one embodiment, optical sorter 134 is capable of detecting plastic materials on an eight feet wide conveyor. Remaining stream from optical sorter 134, predominantly comprising fibers, is divided into fiber browns and remaining fibers. Removed fiber browns are stored in bunker 136, and the remaining fibers are provided as input to picking platform 138, where browns, old newspaper (ONP), plastics and trash are removed. In one embodiment, remaining fibers are provided as dual line input to picking platform 138. Browns, ONP, and trash from picking platform 138 are then transferred to bunkers 140.

Next, a cascading set of optical sorters are used to sort plastics of different colors and sizes. Sensors in these cascading set of optical sorters are capable of identifying plastics of different colors and sizes. Ejected plastics larger than a predetermined size, from optical sorter 134, are provided as input to optical sorter 142. For example, ejected plastics larger than 3 inches are provided as input to optical sorter 142. Optical sorter 142 detects and removes high density polyethylene (HDPE) color plastics from stream. In one embodiment, optical sorter 142 is capable of detecting HDPE color on an eight feet wide conveyor. Output stream 142a comprising ejected HDPE color plastics are transferred to bunker 144 for storage. In the remaining plastics, optical sorter 142 detects plastics of a predetermined size and ejects the detected plastics in a downward trajectory. In one example, sorted plastics smaller than 3 inches are ejected in a downward trajectory. In another example, sorted plastics from about 3 inches to about 7 inches are ejected in a downward trajectory. Output stream 142b comprising ejected plastics of the predetermined size are then transported to bunker 160 for storage. All remaining plastics larger than the predetermined size are provided as input to optical sorter 148.

Optical sorter 148 detects and removes polyethylene terepthalate (PET) plastics from stream. In one embodiment, optical sorter 148 is capable of detecting PET on an eight feet wide conveyor. Output stream 148a comprising ejected PET plastics are transferred to bunker 150 for storage. In the remaining plastics, optical sorter 148 detects plastics of a predetermined size and ejects the detected plastics in a downward trajectory. In one example, sorted plastics smaller than 3 inches are ejected in a downward trajectory. In another example, sorted plastics from about 3 inches to about 7 inches are ejected in a downward trajectory. Output stream 148a comprising ejected plastics of the predetermined size are mixed with output stream 142b, and then transported to bunker 160 for storage. Remaining plastics larger than the predetermined size are provided as input to optical sorter 154.

Optical sorter 154 detects and removes all HDPE natural plastics from stream. In one embodiment, optical sorter 154 is capable of detecting HDPE natural on an six feet wide conveyor. Output stream 154a comprising ejected HDPE natural plastics are transferred to bunker 156 for storage. In the remaining plastics, optical sorter 154 detects plastics of a predetermined size and ejects the detected plastics in a downward trajectory. In one example, sorted plastics smaller than 3 inches are ejected in a downward trajectory. In another example, sorted plastics from about 3 inches to about 7 inches are ejected in a downward trajectory. Output stream 154b comprising ejected plastics of the predetermined size are mixed with output stream 142b, and then transported to bunker 160 for storage.

Another set of cascading optical sorters are used to sort plastics of different colors and sizes from output stream 130a from de-stoner 130. Optical sorter 146 detects and removes all high density polyethylene (HDPE) color plastics from output stream 130c. In one embodiment, optical sorter 146 is capable of detecting HDPE color plastics on a four feet wide conveyor. Output stream 146a comprising ejected HDPE color plastics are mixed with output stream 142a, which is then transferred to bunker 144 for storage. In the remaining plastics, optical sorter 146 detects plastics of a predetermined size and ejects the detected plastics in a downward trajectory. In one example, sorted plastics smaller than 3 inches are ejected in a downward trajectory. In another example, sorted plastics from about 3 inches to about 7 inches are ejected in a downward trajectory. Output stream 146b comprising ejected plastics of the predetermined size are mixed with output stream 142b, which is then transported to bunker 160 for storage. Output stream 146c comprising all remaining plastics larger than the predetermined size are provided as input to optical sorter 152.

Optical sorter 152 detects and removes all high polyethylene terephthalate (PET) plastics from output stream 146c. In one embodiment, optical sorter 152 is capable of detecting PET on a four feet wide conveyor. Output stream 152a comprising ejected PET plastics are mixed with output stream 148a, which is then transferred to bunker 150 for storage. In the remaining plastics, optical sorter 152 detects plastics of a predetermined size and ejects the detected plastics in a downward trajectory. In one example, sorted plastics smaller than 3 inches are ejected in a downward trajectory. In another example, sorted plastics from about 3 inches to about 7 inches are ejected in a downward trajectory. Output stream 152b comprising ejected plastics of the predetermined size are mixed with output stream 142b, which is then transported to bunker 160 for storage. Output stream 152c comprising all remaining plastics larger than the predetermined size are provided as input to optical sorter 158.

Optical sorter 158 detects and removes all high density polyethylene (HDPE) natural plastics from output stream 152c. In one embodiment, optical sorter 158 is capable of detecting HDPE natural plastics on a four feet wide conveyor. Output stream 158a comprising ejected HDPE natural plastics are mixed with output stream 154a, which is then transferred to bunker 156 for storage. In the remaining plastics, optical sorter 158 detects plastics of a predetermined size and ejects the detected plastics in a downward trajectory. In one example, sorted plastics smaller than 3 inches are ejected in a downward trajectory. In another example, sorted plastics from about 3 inches to about 7 inches are ejected in a downward trajectory. Output stream 158b comprising ejected plastics of the predetermined size are re-sorted by mixing with output stream 130c, which is then provided as input to optical sorter 146. Output stream 158c comprising all remaining plastics larger than the predetermined size are provided as input to eddy current separator 162.

Eddy current separator 162 separates the non-ferrous metals from output stream 158c. An eddy current separator includes spinning magnets that eject non-ferrous metals—such as aluminum—off the conveyor. The separator injects the non-ferrous material with the same charge that small magnets in the drum carry. Like charges repel, and the non-ferrous material bounce off the magnets into a chute. Output stream 162a comprising sorted non-ferrous material is transported to bunker 164 for storage. Remaining materials from eddy current separator 166 are disposed as residue in bunker 166. Although not shown, an additional de-stoner, such as de-stoner 130, can be included after eddy current separator 166 to separate generally light material from generally heavy material. Also, the residue remaining after the various separation operations can be recirculated through process 100 to increase the amount of material diverted to the bunkers. The techniques, devices, and systems described in U.S. Provisional Patent Application No. 61/100,038, filed Sep. 25, 2008, entitled System And Method For Tagging Products For Use In Identification Of The Components Therein, U.S. patent application Ser. No. 11/883,758, filed May 27, 2008, entitled Systems And Methods For Sorting Recyclables At A Material Recovery Facility, U.S. patent application Ser. No. 11/487,372, filed Jul. 17, 2006, entitled Systems And Methods For Sorting Recyclables At A Material Recovery Facility, U.S. patent application Ser. No. 11/106,634, filed Apr. 15, 2005, entitled Systems And Methods For Sorting, Collecting Data Pertaining To And Certifying Recyclables At A Material Recovery Facility, now U.S. Pat. No. 7,341,156, issued Mar. 11, 2008, U.S. patent application Ser. No. 11/802,497, filed May 23, 2007, entitled Systems And Methods For Optimizing A Single-Stream Materials Recovery Facility, all incorporated by reference herein, can be used in addition to or in combination with the sorting and separation techniques set forth above.

Depending on market needs and economics, sorted material in each bunker discussed above are either baled for resale to recycling facilities, or may be further processed as engineered feed stock to produce fuel. Sorted wastes may generally be classified as fibers, plastics, fats/oils/grease (FOG), and sludge. Each of these class of sorted wastes may be used to produce engineered feed stock having a predetermined composition to achieve a desired output from a chemical conversion operation. As used herein, desired outputs can include one or many aspects of the product of the chemical conversion operation. For example, desired outputs include, but are not limited to, total quantity of material produced by the operation, the quantity of a particular material present in the entire output from the operation, the ratio of particular materials produced by the operation, the quantity of certain impurities in the entire output from the operation, and the higher heating value of the material produced by the operation.

As set forth above, a gasification unit can advantageously utilize various engineered feed stocks. Thus, for illustrative purposes, an embodiment of the invention employing gasification as the chemical conversion operation is described below. However, other chemical conversion operations are understood to be within the scope of the invention. Engineered feed stock may then be, for example, used in the gasification unit to convert the feed stock into synthesis gas (syngas). Syngas may then be used in boilers to produce steam to run turbines or maybe used in Fischer-Tropsch process to produce fuel.

Figure 2:
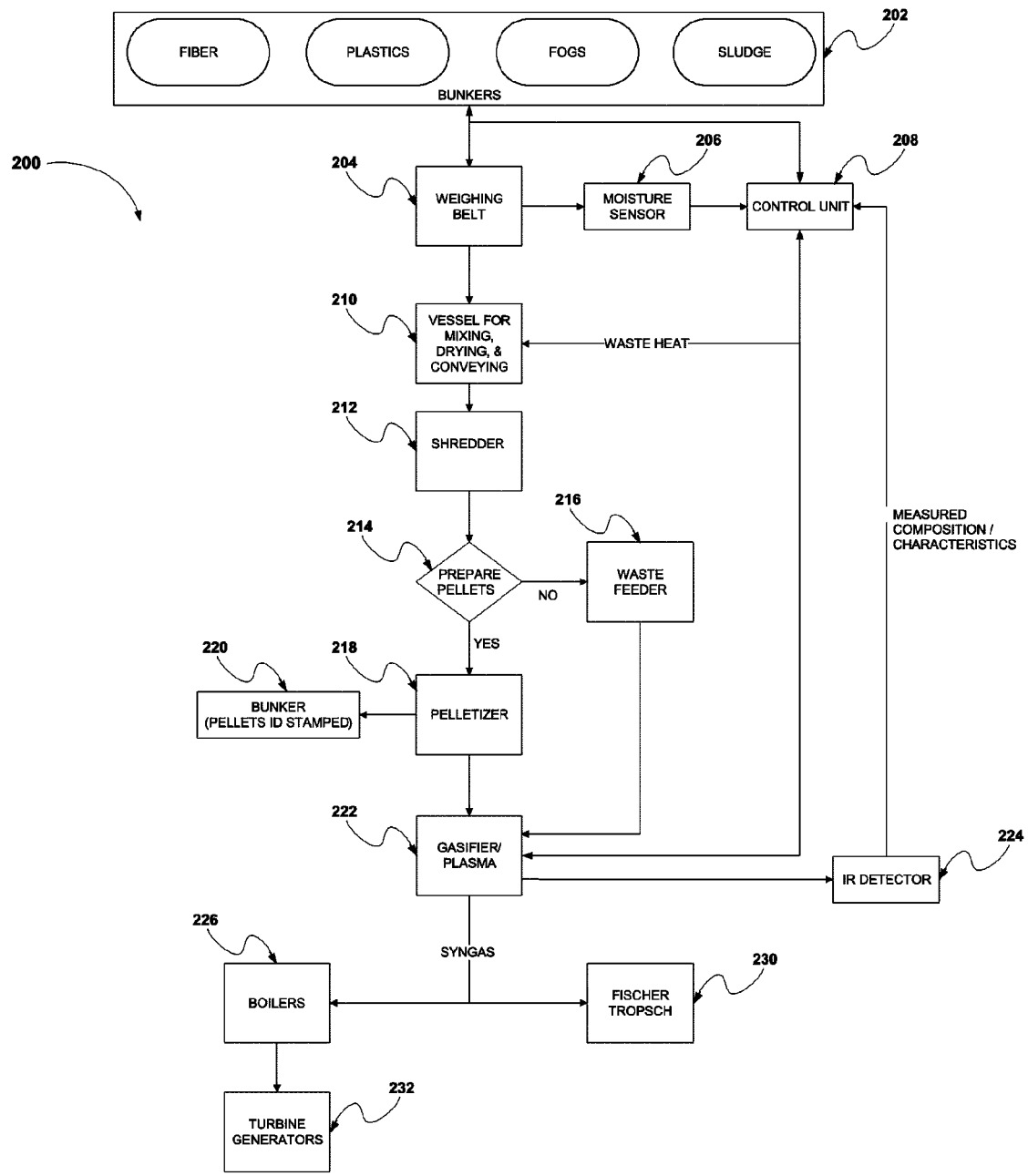
FIG. 2 shows an exemplary flow diagram for processing sorted and separated waste as feed stock for gasification.

FIG. 2, generally at 200, shows an exemplary flow diagram for processing sorted and separated waste as feed stock for gasification. At step 204, each type of waste withdrawn from bunkers 202 are weighed, and its moisture content measured by a moisture sensor 206. For example, feed moisture content may be determined using an infrared detector or a microwave detector. Control unit 208 receives information regarding the moisture content from moisture sensor 206 for each type of waste, and then adjusts the withdrawal rate of the waste accordingly. Control unit 208 specifies the quantity and type of waste to be withdrawn based on a predetermined recipe, which, in turn, is based on the chemical and physical characteristics of the various types of waste. For example, the heating value and/or the chemical composition of the type of waste can be taken into account. Thus, the absolute elemental (e.g., carbon, hydrogen, sulfur, and/or nitrogen) content of the waste, as well as ratios of particular compounds or elements present in the waste, can be used to determine the quantity and type of waste to be withdrawn. After weighing the withdrawn waste at step 204, the wastes are transferred to vessel 210 for mixing and drying. For example, mixing in vessel 210 is performed by an auger. In one aspect of the present invention, waste heat from either gasifier 222 or Fischer-Tropsch equipment 230 may be used for drying waste in vessel 210. Using moisture information received from moisture sensor 206, control unit 208 determines amount of waste heat needed to adjust the moisture content in the waste mixture in vessel 210. Control unit 208 redirects waste heat either from gasifier 224 or from Fischer-Tropsch equipment 230 to vessel 210 until a desired moisture content is reached.

Mixed and moisture adjusted waste material from vessel 210 is transferred to shredder 212. Shredder 212 shreds the waste material to obtain a predetermined size corresponding to a desired gasifier output. The desired gasifier output is determined by control unit 208, and shredding rate in shredder 212 is adjusted by the control unit 208. Control unit 208 can also take into account the cost of shredding the waste material, as decreases in shred size can result in higher operational costs. Based on feed stock requirements to gasifier, control unit 208 determines at step 214 whether to convert shredded waste to pellets. If control unit 208 determines not to convert shredded waste to pellets, shredded waste is fed to waste feeder 216. Waste feeder 216 processes shredded waste into densified feed stock with the optimum characteristics to achieve the desired gasifier output values, and feeds the densified waste directly into gasifier 222. Waste feeder 216 provides a process to drive densified wastes into a reactor vessel (any type) that requires temperature or pressure differentials to be maintained for the reactor to perform at optimal levels. This process will also allow the reactor to receive a uniform rate of feed stock into the reactor. The process has minimal mechanical moving parts and takes advantage of waste properties to seal the reactor.

Moreover, an engineered feed stock not only provides the ability to achieve desired gasifier outputs, but the engineered feed stock also enables an otherwise heterogeneous collection of waste to be used as though the waste were homogeneous. The deconstruction and reconstruction of the waste into engineered feed stock does not change the heterogeneous nature of the waste, rather, embodiments of the invention make the resultant engineered feed stock consistent. Such consistency provides for increased controllability of the gasification process. Without engineered feed stock, a gasification operation may experience unpredictable variations in output as the characteristics of the reactor feed change. The engineered feed stock reduces this variability of the waste feed, thereby adding to the stability of the reaction feed system. Thus, embodiments of the invention enable precise levels of mixing of various solid wastes and liquids to optimize discharge characteristics required for optimal reaction and fuel requirements. Moreover, embodiments of the invention enable the creation of engineered feed stocks having chemical compositions that do not occur in nature, thereby reducing undesirable effects that occur with the gasification of natural fuels, e.g., the formation of $SO_X$ and $NO_X$.

If control unit 208 determines that shredded waste are to be converted to pellets, then shredded waste from shredder 212 is transferred to pelletizer 218. Pelletizer 218 converts shredded waste to pellets capable of undergoing pyrolysis at a predetermined rate. In one implementation, a Lundell 850 densifier (available from Lundell Manufacturing Company, Inc., of Cherokee, Iowa) can be used as pelletizer 218. The Lundell densifier can produce a pellet of about 2 inches to about 6 inches in length and having a bulk density of about 45 $lb/ft^3$ to about 60 $lb/ft^3$. Other methods of densification can be used in place of pelletizer 218, which can produce pellets having greater or lesser length and greater or lesser bulk density and remain within the scope of the invention. Moreover, the techniques, devices, and systems described in U.S. patent application Ser. No. TBA, filed Jun. 25, 2009, entitled Engineered Fuel Pellet Useful For Displacement Of Coal In Coal Firing Plants, U.S. patent application Ser. No. TBA, filed Jun. 25, 2009, entitled Engineered Fuel Pellet, U.S. patent application Ser. No. TBA, filed Jun. 25, 2009, entitled Engineered Inert Fuel Pellet, all incorporated by reference herein, can be used in addition or in combination with the pelletizing techniques set forth above. Pellets from pelletizer 218 are fed into gasifier 222 based on a feedrate requirement determined by control unit 208. Excess pellets from pelletizer 218 are modified to include identifiers, and then transferred to bunker 220 for storage.

Pellets fed into gasifier 222 undergo pyrolytic conversion to syngas. Infrared detector 224 determines the composition of syngas and transfers the information to control unit 208. Composition information from infrared detector 224 is used by control unit 208 to adjust withdrawal rate of wastes from bunkers 202, and adjust moisture content in waste mixture to obtain the desired gasification outputs. The feedrate into gasifier 222 can also be determined, at least in part, by the rate of consumption of the pellets, e.g., the feedrate may be controlled in order to maintain a steady level of material in gasifier 222. Syngas produced by gasifier 222 may either be used in boilers 226 to produce steam to run turbines 232, or be used in Fischer-Tropsch process 230 to produce fuel.

Figure 3:
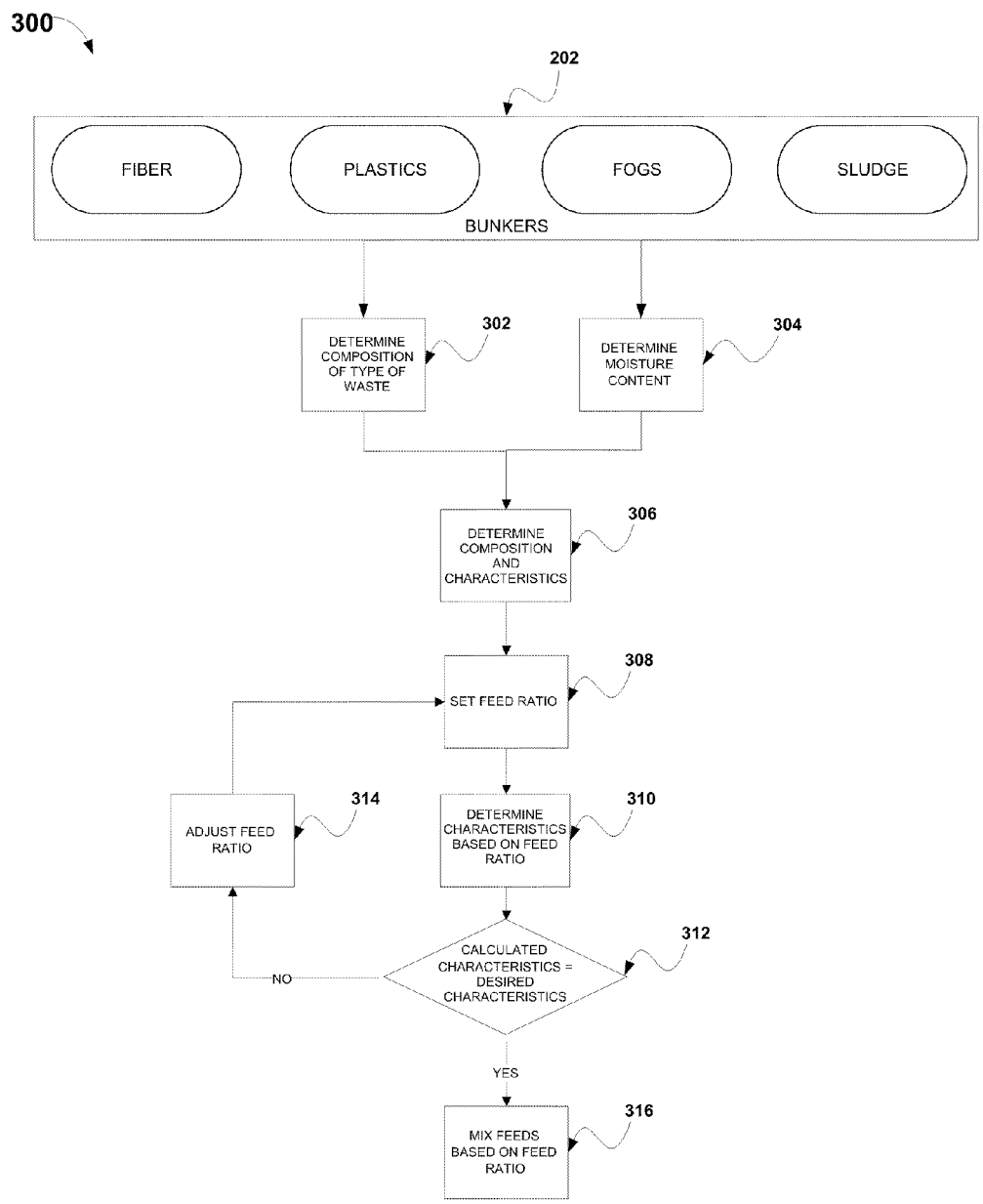
FIG. 3 shows a flow diagram for processing waste feeds from multiple sources.
Figure 4:
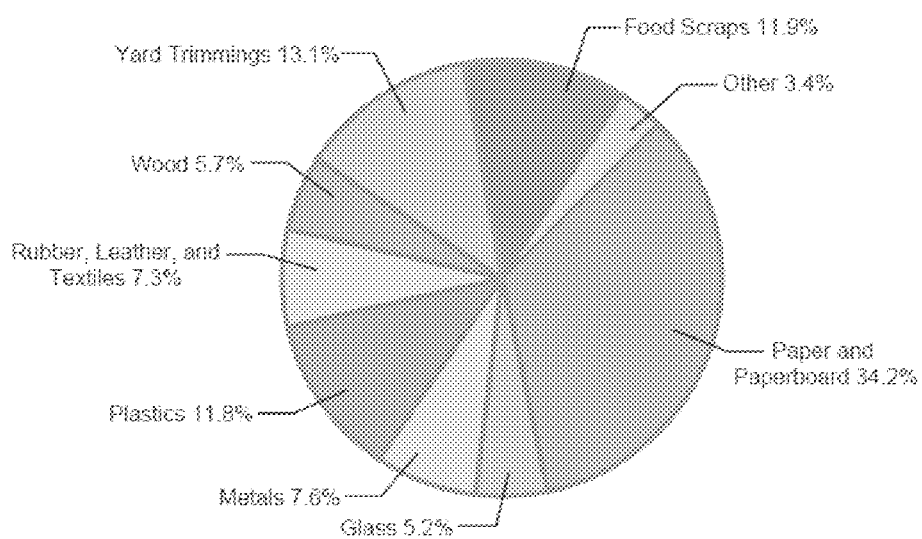
FIG. 4 shows estimates of typical waste composition in communities in the United States.

FIG. 3, generally at 300, shows an exemplary method of processing different waste types stored in bunkers to generate feed stocks suitable for gasification and having a particular composition and characteristics to achieve a desired gasifier output, e.g., a gas of given energy content, a specified molar ratio of carbon to hydrogen content, and/or other characteristics as set forth herein. FIG. 3 also illustrates a method of adjusting the quantity of each type of waste to be combined into a feed stock based on the desired composition and characteristics of the feed stock to achieve the desired gasifier output, e.g., syngas energy content, syngas hydrogen to carbon monoxide ratio, and/or total hydrogen and carbon monoxide production rate. Waste that is sorted into fibers, plastics, FOG, and sludge and stored in bunkers 202 may contain components of different compositions and moisture content. Further, the comingled waste can be sorted into specific types of waste other than those illustrated in FIG. 3, e.g., paper, newsprint, magazines, specific plastic types, textiles, yard waste, and rubber. The composition and moisture content of each type of waste can vary based on their source and time of year, but the overall differences are not substantial. FIG. 4 shows estimates of the typical MSW composition in communities in the United States. In particular, FIG. 4 illustrates that total MSW Generation in communities in the United States before recycling is equal to 246 million tons.

Heat content of raw waste depends on the concentration of combustible organic materials in the waste and its ash and moisture content. Similarly, different types of waste have different chemical compositions. Table 1 shows exemplary data on the combustible composition of waste.

TABLE 1

| Component | Percent by weight (dry basis) | | | | | |
|---|---|---|---|---|---|---|
| | Carbon | Hydrogen | Oxygen | Nitrogen | Sulfur | Ash |
| Organic | | | | | | |
| Food wastes | 48.0 | 6.4 | 37.6 | 2.6 | 0.4 | 5.0 |
| Paper | 43.5 | 6.0 | 44.0 | 0.3 | 0.2 | 6.0 |
| Cardboard | 44.0 | 5.9 | 44.6 | 0.3 | 0.2 | 5.0 |
| Plastics | 60.0 | 7.2 | 22.8 | — | — | 10.0 |
| Textiles | 55.0 | 6.6 | 31.2 | 4.6 | 0.15 | 2.5 |
| Rubber | 78.0 | 10.0 | — | 2.0 | — | 10.0 |
| Leather | 60.0 | 8.0 | 11.6 | 10.0 | 0.4 | 10.0 |
| Yard wastes | 47.8 | 6.0 | 38.0 | 3.4 | 0.3 | 4.5 |
| Wood | 49.5 | 6.0 | 42.7 | 0.2 | 0.1 | 1.5 |
| Inorganic | | | | | | |
| Glass | 0.5 | 0.1 | 0.4 | <0.1 | — | 98.9 |
| Metals | 4.5 | 0.6 | 4.3 | <0.1 | — | 90.5 |
| Dirt, ash, etc. | 26.3 | 3.0 | 2.0 | 0.5 | 0.2 | 68.0 |

At step 302, compositions of each waste component are determined. Exemplary methods of determining the compositions include thermo gravimetric analysis, Prompt Gamma Neutron Activation Analysis (PGNAA), Dual-Energy Gamma Attenuation, and the like. Feed composition can also be determined from a lookup table (for example, Table 1). Next, the moisture content in each type of waste is measured at step 304. In one embodiment, moisture content is determined using an infrared detector. In another embodiment, moisture content is determined using a microwave detector. Once the moisture content and compositions are determined, the composition and characteristics of each type of waste is determined at step 306. An exemplary method of calculating the energy content of the waste types includes calorimetry. The energy content can be expressed in kJ per kilogram (kJ/kg).

The techniques, devices, and systems described in U.S. Pat. No. 7,341,156, incorporated above, can be used in conjunction with various lookup tables and/or other sources of composition data to determine overall feed composition. That patent discloses techniques for separating various types of comingled waste using optical sorting devices. In addition, optical composition recorders and controllers are used to collect and accumulate data on the type, volume, and quality of the various types of waste that are processed, e.g., paper and plastic. Thus, as the optical sorters and composition recorders process a mixed stream of MSW, the controllers amass data representative of the quantity and quality of certain materials in a particular bunker. This information and the information in the lookup tables is then used to determine an average composition of the material presently stored in a particular bunker. This composition information can then be used, as set forth below, to determine how much material from a particular bunker is needed to form a feed stock of a desired composition.

For example, different types of plastics have different chemical compositions, e.g., the chemical formula for PET monomer is $C_{10}H_8O_4$, while the chemical formula for LDPE monomer is $C_2H_4$, and those materials have different energy content. Thus, as a sorting process (such as the embodiments set forth above) diverts items of different plastic types to a single bunker, the ratio of carbon to hydrogen, in the aggregate, changes as the different items are added to the bunker. Likewise, the aggregate energy content changes as different items are added. The techniques set forth above enable the determination of the aggregate composition and energy content of the material in each bunker. Thus, as the plastic materials of different types are all diverted to a plastic material bunker, the controllers take the quantity and particular type of plastic into account in determining the overall composition and energy content of the material in the bunker. This aggregate composition information can then be used, as set forth below, to determine the quantity of mixed plastic to use in order to achieve a feed stock of desired composition. As described herein, the control of feed stock composition and characteristics is not limited carbon to hydrogen ratio and energy content, but can include, and is not limited to, total hydrogen and carbon monoxide production, total contaminate content, total pollutant content, content of a particular compound, ash characteristics, etc.

At step 308, a feed ratio is set based on the overall characteristics, including composition, of each type of waste, and the overall desired characteristics corresponding to the final feed stock ratio is calculated at step 310. At step 312, the method determines whether the calculated characteristics are equal to the desired characteristics needed to achieve the desired gasification outputs. If at step 312 the method determines that the calculated characteristics equal the desired characteristics needed for gasification, then at step 316, the waste types are mixed according the feed ratio set at step 310. If at step 312 the method determines that the calculated characteristics are not equal to the desired characteristics needed for gasification, then at step 314, the feed ratio is adjusted until the calculated characteristics correspond to the desired characteristics of feed required by the gasification unit. Although not shown, the mixed waste types can be densified, such as in a pelletizer, as set forth above.

The disclosure herein, in combination with techniques, devices, and systems described in U.S. Pat. No. 7,341,156, incorporated above, also enable the data regarding the final composition of the engineered feed stock to be certified, which can then be provided to a third party. As set forth above, the aggregate composition of the material in a particular bunker can be determined using, for example, the optical sorters and composition recorders. As each type of waste from the bunkers is combined according to a known feed ratio, the final composition of the engineered feed stock is known. Thus, an operator of the systems described herein can certify the composition of the engineered feed stock to a third party, such as a syngas producer, electrical power producer, and/other party using the engineered feed stock. Moreover, the contents of each bunker can be similarly certified. Such a certification enables third parties to improve the control of chemical conversion processes that consume the engineered feed stocks by providing information about the composition and characteristics of the feed stocks prior to their use. In addition, the certification data can be used to establish pricing for the various engineered feed stocks and to facilitate calculation of feed stock generation and usage on a volumetric and/or weight basis.

Because the physical characteristics and chemical composition of a particular feed stock is known, the techniques set forth herein also enable the feed stocks to be classified and ranked relative to each other. Thus, the feed stock could be ranked and classified according to the energy content of the feed stocks that is released during combustion. Likewise, the feed stocks could be ranked on the basis of various pollutants that are generated during combustion or gasification. Further still, existing classification methods could be applied to the feed stocks to obtain comparative data. For example, the Parr formulas used to classify and rank coal can be applied to the feed stocks, thereby enabling the estimation of certain properties associated therewith. The Parr formulas are set forth in Equations 1-3.

$$F' = \frac{100(F - 0.15S)}{100 - (M + 1.08A + 0.55S)} \quad \text{Equation 1}$$

$$V' = 100 - F' \quad \text{Equation 2}$$

$$Q' = \frac{100(Q - 50S)}{100 - (M + 1.08A + 0.55S)} \quad \text{Equation 3}$$

where:
M=wt % moisture (moist basis)
F=wt % fixed carbon (moist basis)
A=wt % ash (moist basis)
S=wt % sulfur (moist basis)
Q=BTU/lb (moist basis)
F'=wt % fixed carbon (dry basis)
V'=wt % volatile matter (dry basis)
Q'=wt % BTU/lb (dry basis)

Figure 5:
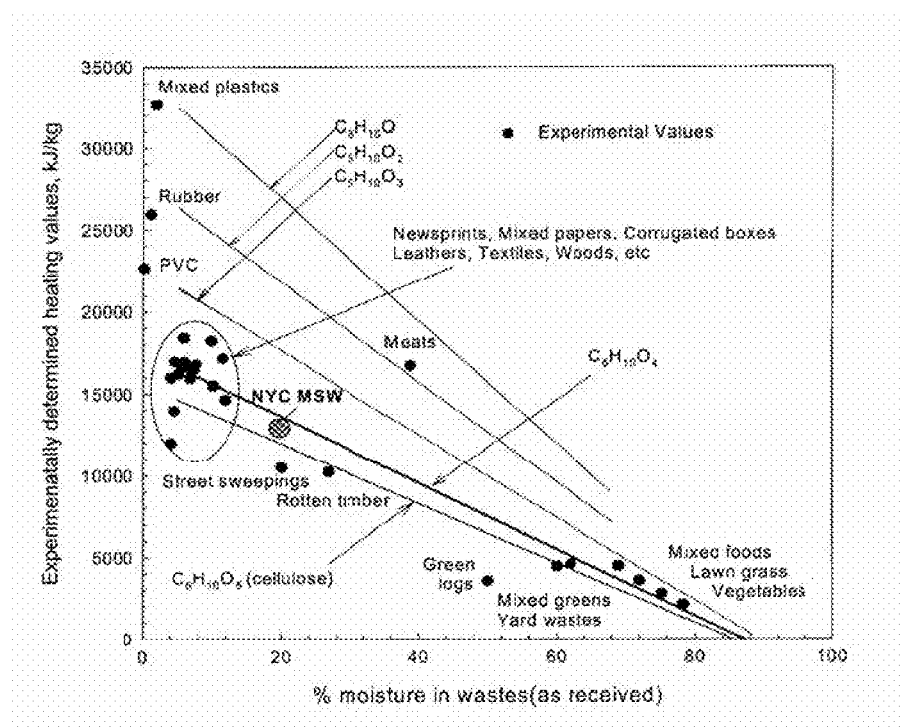
FIG. 5 illustrates effects of moisture on heating value of waste materials.

In one embodiment of the present invention, it is desirous to produce an engineered feed stock of relatively high energy content. In such an embodiment, the feeds of waste are further mixed with at least one component that contributes to increasing the energy content of the overall feed stock. In another embodiment of the present invention, the overall feed stock energy content is adjusted by decreasing the moisture content of at least one component of the feed. For example, on average, raw MSW has an energy content of roughly 13,000 kJ/kg or about half that of bituminous coal, and the moisture content of raw MSW is 20% on average. FIG. 5 shows an exemplary illustration of how the energy content of MSW and its components change with moisture content. Points shown are experimental values, and solid lines show the thermochemical calculations for various organic compounds. FIG. 5 shows that mixed plastics and rubber contribute the highest energy content to municipal solid waste. Moist food and yard wastes have the lowest energy content and are better suited for composting, rather than for combustion or gasification.

Figure 6:
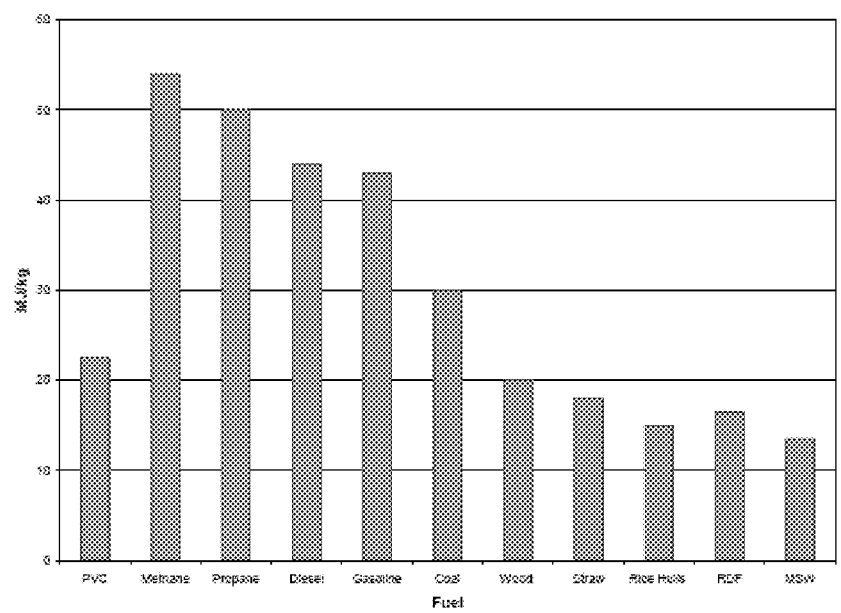
FIG. 6 shows heating values of waste feed stocks.

FIG. 6 shows exemplary energy content of various materials, including raw MSW. Based on the thermodynamic properties of the combustible components of municipal solid waste, the following are exemplary molecular formulas for the key components of MSW:

Mixed paper: $C_6H_{9.6}O_{4.6}N_{0.036}S_{0.01}$
Mixed plastics: $C_6H_{8.6}O_{1.7}$
Mixed food wastes: $C_6H_{9.6}O_{3.5}N_{0.28}S_{0.2}$
Yard wastes: $C_6H_{9.2}O_{3.8}N_{0.01}S_{0.04}$ The hydrocarbon formula that most closely approximates the mix of organic wastes in MSW is $C_6H_{10}O_4$.

Ash composition and concentration of a fuel can result in agglomeration in a gasification vessel leading to clogging of gasifiers and increased tar formation. In general, slagging does not occur with fuels having an ash content below 5%. MSW has high ash content (10-12%), versus coal ash (5-10%) and wood wastes (1-5% ash). Raw MSW can be converted into a better fuel for power generation by making it more homogeneous.

Figure 7:
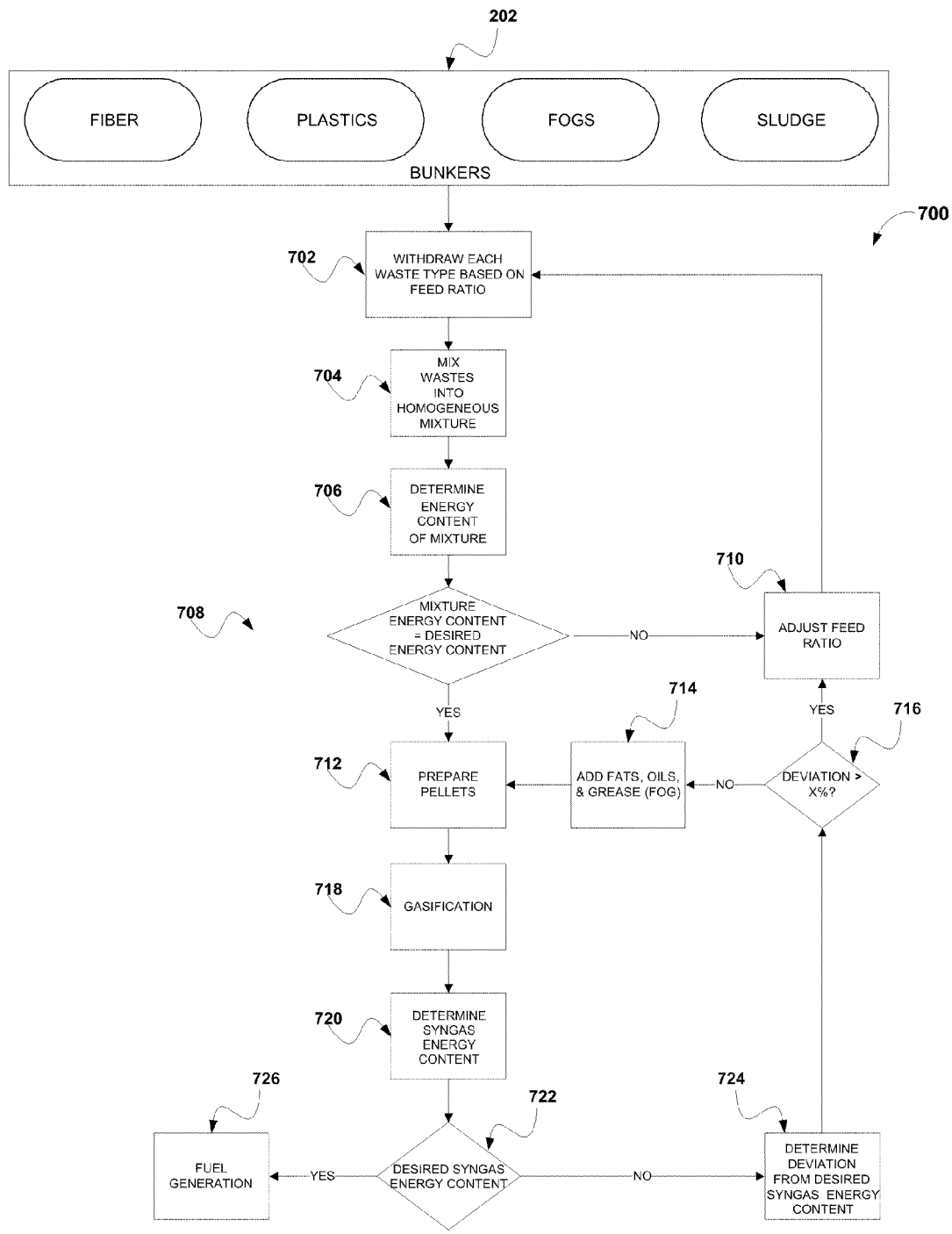
FIG. 7 shows a flow diagram for processing waste feeds into a homogeneous fuel having a desired energy content suitable for gasification.

FIG. 7 illustrates an exemplary method 700 of processing waste types received from various sources on different days into a homogeneous fuel having a desired energy content suitable for gasification to produce a fuel gas. At step 702, each waste type is withdrawn from bunkers 202 based on a feed ratio, as determined at step 310 in FIG. 3. Withdrawn waste types can be reduced in size by a shredder, as set forth above. At step 704, shredded wastes are mixed into a homogeneous mixture. At step 706, energy content in the mixed feed is calculated based on the feed ratio and energy content of the feed components. At step 708, calculated energy content is compared with the desired energy content of feed stock for gasification. If the energy content of the mixed feed does not equal the desired energy content, then at step 710, feed ratio of the waste types is adjusted based on the deviation of mixed feed energy content from desired energy content.

If the energy content of the mixed waste types equals the desired energy content, then at step 712, mixed waste is densified for optimum volatilization during gasification. In one embodiment of the present invention, the mixed feed is densified (e.g., into pellets) to achieve a higher density feed. This, in turn, can increase the capacity of the gasifier and/or aid in reducing the required residence time in the gasification reactor, thereby allowing for complete conversion. Table 2 illustrates exemplary specifications of a MSW feed for a gasification system. In one implementation of the present invention, the mixed waste feed stock is densified into pellets. While a range of values for thermal diffusivity is provided, this characteristic can be outside of the range stated when pelletized feed stock has sufficient porosity.

TABLE 2

| Diameter | 0.635 cm to 7.62 cm |
|---|---|
| Length | 1.27 cm to 15.24 cm |
| Bulk Density | 160 kg/m³ to 1202 kg/m³ |
| Surface to Volume | 20:1 to 3:1 |
| Porosity | 0.4 to 0.6 |
| Aspect Ratio | 1 to 10 |
| Thermal Conductivity | 0.04 W/mK to 1.0 W/mK |
| Specific Heat Capacity | 0.2 J/kgK to 2 J/kgK |
| Thermal Diffusivity | $1 \times 10^{-6}$ m²/s to $2 \times 10^{-5}$ m²/s |
| Net Calorific Value | 6,900 kJ/kg to 35,000 kJ/kg |
| Moisture | 5-25% |
| Volatile Matter | 40% to 80% |
| Fixed Carbon | 5% to 20% |
| Carbon | 30% to 80% |
| Sulfur | <1% |
| Chlorine | <0.5% |
| Ash | <10% |

At step 718, the densified feed stock undergoes gasification. During and after gasification of densified feed, the energy content of syngas generated is determined at step 720. Calculated syngas energy content from step 720 is compared with the desired energy content for the syngas at step 722. If the energy content generated is less than the desired energy content, then at step 724, the deviation from the desired energy content is calculated. At step 716, the method determines whether the deviation from the desired energy content is greater than a predetermined threshold value. For example, the threshold value may vary from about 5% to about 20%. If the deviation from the desired value is greater than a predetermined threshold value, then at step 710 feed ratios of waste types are adjusted using this deviation. New waste types are withdrawn at step 702 using this adjusted feed ratio from step 710. If the deviation is less than a predetermined threshold value, then at step 714, energy content of mixed feed is adjusted by addition of additives. Exemplary additives include fats, oils, grease, yard waste, sludge, glycerin, tires, crumb rubber, petroleum waste, and the like. In one embodiment of the present invention, if the deviation is less than by at least 10%, feed rates of densified feed (e.g., pellets) into the gasification reactor is adjusted based on the measured deviation of energy content. If at step 722 the calculated syngas energy content from step 720 is determined to be equal to the desired energy content, then at step 726, the syngas is processed further to generate fuel. As set forth above, manipulating feed stock composition and characteristics to control for energy content is merely an illustrative example of one embodiment of the invention. Other characteristics of the mixed feed stock can be manipulate to control for other desired gasifier outputs. These desired outputs can include, but are not limited to, carbon monoxide to hydrogen ratio in syngas production, low contaminate content in syngas production, and/or overall syngas production.

Aspects of method 700 can be modified to achieve homogeneous feed stock having a chemical composition suitable for gasification to produce a syngas of a desired composition. As set forth above, the aggregate chemical composition of the material in a particular bunker can be determined. Thus, rather than controlling for energy content, method 700 controls for aggregate chemical composition of the mixture in order to achieve a feed stock that produces a syngas of desired composition when the feed stock is gasified. Further still, the methods set forth herein can produce a feed stock with a particular composition and characteristics so as to produce a desired output from another type of chemical conversion. For example, a feed stock yielding a relatively high amount of heat when burned, while emitting a relatively low amount of pollutants (e.g., $SO_x$, $NO_x$, chlorine, etc.) can be produced. In such an implementation, certain chemical compounds (e.g., CaO, ZnO, etc.) can be added at step 714 to react in-situ with potential pollutants in the feed stock mixture.

The following tables provide illustrative examples of engineered feed stocks that have been created using the techniques described herein. The following are examples only, and other feed stocks, composed of other waste types and having different compositions, are within the scope of the invention. In addition to the physical characteristics and chemical composition of the engineered feed stocks, the tables provide the quantitative ratios, e.g., weight percentage, volumetric percentage, etc., of particular types of waste that were blended to produce the particular feed stock. For example, feed stock #1 was produced from 82 wt % newsprints and 18 wt % plastics—thus, the quantitative ratio is 82 parts newsprints to 18 parts plastics. In the tables below, the data in the column labeled "AR" represents the composition as received by a gasification process (set forth in more detail below), and the data in the column labeled "MF" represents a moisture free composition.

The illustrative feed stocks were gasified, and the output results were obtained. This information is also included in the tables below. The feed stocks were gasified using the following procedure. Gasification tests were performed at a laboratory scale stratified downdraft gasifier. The gasifier has an inside diameter of 6 inches and a height of 24 inches above a perforated grate. There are four Type-K thermocouples installed along the gasifier, 1", 7", 19" above the grate and 4" below the grate. The real-time temperatures are recorded by a data logger thermometer (OMEGA, HH309A). A syngas sampling train, consisting of two water scrubbers, and a vacuum pump is used for taking syngas samples, which is analyzed by a HP5890A gas chromatograph to obtain volumetric fractions of H2, N2, CO, CO2 and CH4. A dry gas test meter is installed in the air entrance to measure the air intake rate. As shown in the tables below, the output from the gasifier can be affected by manipulating the types of waste that are blended into the feed stock to be processed by the gasifier.

TABLE 3

Feed stock #1

| | FS#1 82 wt % Newsprints, 18 wt % Plastics | |
|---|---|---|
| | AR | MF |
| Moisture, wt % | 3.25 | |
| Ash, wt % | 4.51 | 4.66 |
| Volatile, wt % | 86.43 | 89.33 |
| Fixed Carbon, wt % | 5.81 | 6.01 |
| Sulfur, WT % | 0 | 0.01 |
| Hydrogen, wt % | 7.57 | 7.82 |
| Carbon, wt % | 51.88 | 53.62 |
| Nitrogen, wt % | 0.06 | 0.06 |
| Oxygen, wt % | 32.65 | 33.75 |
| Carbon/Hydrogen | 6.9 | 6.9 |
| Carbon/Oxygen | 1.6 | 1.6 |
| HHV (BTU/lb) | 9,552 | 9,873 |
| HHV (BTU/lb), Calculated | | 10,696 |
| Density (lb/cu. Ft) | 20.3 | |

TABLE 4

Feed stock #1 Gasifier Output

| Hydrogen, vol % | 14.9 |
|---|---|
| Nitrogen, vol % | 51.6 |
| Carbon Monoxide, vol % | 18.9 |
| Methane, vol % | 2.3 |
| Carbon Dioxide, vol % | 12.3 |
| Hydrogen/Carbon Monoxide | 0.79 |
| BTU/scf | 134.79 |
| Carbon Monoxide + Hydrogen | 33.8 |

TABLE 5

Feed stock #2

| | FS#2 36 wt % Magazines, 64 wt % Plastics | |
|---|---|---|
| | AR | MF |
| Moisture, wt % | 0.94 | |
| Ash, wt % | 6.53 | 6.59 |
| Volatile, wt % | 92.48 | 93.36 |
| Fixed Carbon, wt % | 0.05 | 0.05 |

TABLE 5-continued

Feed stock #2

| | FS#2 36 wt % Magazines, 64 wt % Plastics | |
|---|---|---|
| | AR | MF |
| Sulfur, wt % | 0.05 | 0.01 |
| Hydrogen, wt % | 9.51 | 9.60 |
| Carbon, wt % | 68.85 | 69.50 |
| Nitrogen, wt % | 0.01 | 0.01 |
| Oxygen, wt % | 14.12 | 14.25 |
| Carbon/Hydrogen | 7.2 | 7.2 |
| Carbon/Oxygen | 4.9 | 4.9 |
| HHV (BTU/lb) | 13,991 | 14,124 |
| HHV (BTU/lb), Calculated | | 15,064 |
| Density (lb/cu. Ft) | | |

TABLE 6

Feed stock #2 Gasifier Output

| | |
|---|---|
| Hydrogen, vol % | 21.9 |
| Nitrogen, vol % | 45.6 |
| Carbon Monoxide, vol % | 18.9 |
| Methane, vol % | 6.4 |
| Carbon Dioxide, vol % | 7.3 |
| Hydrogen/Carbon Monoxide | 1.16 |
| BTU/scf | 200.21 |
| Carbon Monoxide + Hydrogen | 40.8 |

TABLE 7

Feed stock #3

| | FS#3 24.5 wt % Other Papers, 75.5 wt % Textiles | |
|---|---|---|
| | AR | MF |
| Moisture, wt % | 1.57 | |
| Ash, wt % | 7.57 | 7.69 |
| Volatile, wt % | 75.12 | 76.32 |
| Fixed Carbon, wt % | 15.74 | 15.99 |
| Sulfur, wt % | 0.37 | 0.01 |
| Hydrogen, wt % | 5.85 | 5.94 |
| Carbon, wt % | 48.12 | 48.89 |
| Nitrogen, wt % | 8.38 | 8.51 |
| Oxygen, wt % | 28.14 | 28.59 |
| Chlorine, wt % | 3.44 | 3.49 |
| Carbon/Hydrogen | 8.2 | 8.2 |
| Carbon/Oxygen | 1.7 | 1.7 |
| HHV (BTU/lb) | 9,629 | 9,783 |
| HHV (BTU/lb), Calculated | | 8,705 |
| Density (lb/cu. ft) | 21.9 | |

TABLE 8

Feed stock #3 Gasifier Output

| | |
|---|---|
| Hydrogen, vol % | 6.5 |
| Nitrogen, vol % | 64.6 |
| Carbon Monoxide, vol % | 19.3 |
| Methane, vol % | 0.3 |
| Carbon Dioxide, vol % | 9.3 |
| Hydrogen/Carbon Monoxide | 0.3 |
| BTU/scf | 88.6 |
| Carbon Monoxide + Hydrogen | 25.7 |

TABLE 9

Feed stock #4

| | FS#4 91.8 wt % Newsprint, 2.2 wt % Plastics, 6.0 wt % Yard wastes | |
|---|---|---|
| | AR | MF |
| Moisture, wt % | 3.64 | |
| Ash, wt % | 9.62 | 9.98 |
| Volatile, wt % | 77.26 | 80.18 |
| Fixed Carbon, wt % | 9.48 | 9.84 |
| Sulfur, wt % | 0.08 | 0.01 |
| Hydrogen, wt % | 5.45 | 5.66 |
| Carbon, wt % | 41.81 | 43.39 |
| Nitrogen, wt % | 0.07 | 0.07 |
| Oxygen, wt % | 39.33 | 40.82 |
| Carbon/Hydrogen | 7.7 | 7.7 |
| Carbon/Oxygen | 1.1 | 1.1 |
| HHV (BTU/lb) | 7,296 | 7,572 |
| HHV (BTU/lb), Calculated | | 7,520 |
| Density (lb/cu. Ft) | 33.7 | |

TABLE 10

Feed stock #4 Gasifier Output

| | |
|---|---|
| Hydrogen, vol % | 19.8 |
| Nitrogen, vol % | 46.4 |
| Carbon Monoxide, vol % | 24.7 |
| Methane, vol % | 1.2 |
| Carbon Dioxide, vol % | 8.0 |
| Hydrogen/Carbon Monoxide | 0.80 |
| BTU/scf | 159.2 |
| Carbon Monoxide + Hydrogen | 44.5 |

TABLE 11

Feed stock #5

| | FS#5 68 wt % paper, 32 wt % Rubber | |
|---|---|---|
| | AR | MF |
| Moisture, wt % | 1.35 | |
| Ash, wt % | 9.11 | 9.23 |
| Volatile, wt % | 77.18 | 78.24 |
| Fixed Carbon, wt % | 12.36 | 12.53 |
| Sulfur, wt % | 0.23 | 0.01 |
| Hydrogen, wt % | 5.84 | 5.92 |
| Carbon, wt % | 45.92 | 46.55 |
| Nitrogen, wt % | 0.01 | 0.01 |
| Oxygen, wt % | 37.55 | 38.06 |
| Chlorine, wt % | 0.219 | 0.22 |
| Carbon/Hydrogen | 7.9 | 7.9 |
| Carbon/Oxygen | 1.2 | 1.2 |
| HHV (BTU/lb) | 9,250 | 9,377 |
| HHV (BTU/lb), Calculated | | 8,288 |
| Density (lb/cu. Ft) | | |

TABLE 12

Feed stock #5 Gasifier Output

| | |
|---|---|
| Hydrogen, vol % | 14.9 |
| Nitrogen, vol % | 51.6 |
| Carbon Monoxide, vol % | 17.0 |
| Methane, vol % | 3.4 |
| Carbon Dioxide, vol % | 13.1 |
| Hydrogen/Carbon Monoxide | 0.88 |

TABLE 12-continued

Feed stock #5 Gasifier Output

| | |
|---|---|
| BTU/scf | 140.56 |
| Carbon Monoxide + Hydrogen | 31.8 |

TABLE 13

Feed stock #6

| | FS#6 100 wt % Rubber | |
|---|---|---|
| | AR | MF |
| Moisture, wt % | 0.06 | |
| Ash, wt % | 6.12 | 6.12 |
| Volatile, wt % | 68.46 | 68.50 |
| Fixed Carbon, wt % | 25.36 | 25.38 |
| Sulfur, wt % | 1.92 | 0.01 |
| Hydrogen, wt % | 6.78 | 6.78 |
| Carbon, wt % | 81.73 | 81.78 |
| Nitrogen, wt % | 0.18 | 0.18 |
| Oxygen, wt % | 3.21 | 3.21 |
| Carbon/Hydrogen | 12.1 | 12.1 |
| Carbon/Oxygen | 25.5 | 25.5 |
| HHV (BTU/lb) | 15,780 | 15,789 |
| HHV (BTU/lb), Calculated | | 15,768 |
| Density (lb/cu. Ft) | 28.6 | |

TABLE 14

Feed stock #6 Gasifier Output

| | |
|---|---|
| Hydrogen, vol % | 8.65 |
| Nitrogen, vol % | 68.2 |
| Carbon Monoxide, vol % | 14.5 |
| Methane, vol % | 0.71 |
| Carbon Dioxide, vol % | 6.9 |
| Hydrogen/Carbon Monoxide | 0.60 |
| BTU/scf | 83.7 |
| Carbon Monoxide + Hydrogen | 23.2 |

TABLE 15

Feed stock #7

| | FS#7 80 wt % Rubber, 20 wt % Paper + water to 13 wt % | |
|---|---|---|
| | AR | MF |
| Moisture, wt % | 13.1 | |
| Ash, wt % | 3.84 | 4.42 |
| Volatile, wt % | 61.94 | 71.28 |
| Fixed Carbon, wt % | 21.12 | 24.30 |
| Sulfur, wt % | 1.28 | 0.01 |
| Hydrogen, wt % | 5.87 | 6.75 |
| Carbon, wt % | 75.12 | 86.44 |
| Nitrogen, wt % | 0.03 | 0.03 |
| Oxygen, wt % | 0.77 | 0.89 |
| Chlorine, wt % | 0.076 | 0.09 |
| Carbon/Hydrogen | 12.8 | 12.8 |
| Carbon/Oxygen | 97.6 | 97.6 |
| HHV (BTU/lb) | 14,405 | 16,577 |
| HHV (BTU/lb), Calculated | | 16,574 |
| Density (lb/cu. ft) | | |

TABLE 16

Feed stock #7 Gasifier Output

| | |
|---|---|
| Hydrogen, vol % | 28.6 |
| Nitrogen, vol % | 45.2 |
| Carbon Monoxide, vol % | 15.6 |
| Methane, vol % | 2.7 |
| Carbon Dioxide, vol % | 7.9 |
| Hydrogen/Carbon Monoxide | 1.83 |
| BTU/scf | 173.8 |
| Carbon Monoxide + Hydrogen | 44.2 |

TABLE 17

Feed stock #8

| | FS#8 100 wt % dry rubber (Signature Premium Rubber Mulch) | |
|---|---|---|
| | AR | MF |
| Moisture, wt % | 0.84 | |
| Ash, wt % | 4.51 | 4.55 |
| Volatile, wt % | 69.32 | 69.91 |
| Fixed Carbon, wt % | 25.33 | 25.54 |
| Sulfur, wt % | 1.62 | 0.01 |
| Hydrogen, wt % | 7.08 | 7.14 |
| Carbon, wt % | 85.37 | 86.09 |
| Nitrogen, wt % | 0.15 | 0.15 |
| Oxygen, wt % | 0.43 | 0.43 |
| Carbon/Hydrogen | 12.1 | 12.1 |
| Carbon/Oxygen | 198.5 | 198.5 |
| HHV (BTU/lb) | 16,331 | 16,469 |
| HHV (BTU/lb), Calculated | | 16,765 |
| Density (lb/cu. ft) | 21.4 | |

It is thought that the integrated waste storage system and method of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

What is claimed is:

1. A system, comprising:
   a separation system for separating waste constituents of a solid waste stream including separating plastics from fiber materials and forming a first type comprising predominately plastics and forming a second type comprising predominately fiber materials;
   a first bunker for storing the first type comprising predominately plastic materials;
   a second bunker for storing the second type comprising predominately paper materials;
   wherein the waste constituents of the first type are differentiated from the waste constituents of the second type based on moisture content and based on how a blended feed stock comprising a combination of the waste constituents from the first and second bunkers affects a total quantity of heat released by a combustion process when said blended feed stock is converted in said combustion process; and
   a control unit configured to control a rate of withdrawal of a first amount of the waste constituents of the first type from the first bunker based on information associated with a moisture content of the waste constituents of the first type, the control unit configured to control a rate of withdrawal of a first amount of the waste constituents of the second type from the second bunker based on information associated with a moisture content of the waste constituents of the second type, the first amount of the waste constituents of the first type and the first amount of the waste constituents of the second type for combining into the blended feed stock.

2. The system of claim 1, wherein the solid waste stream comprises mixed municipal solid waste.

3. The system of claim 1, wherein the solid waste stream comprises a source segregated stream.

4. The system of claim 3, wherein the source segregated stream comprises recyclable materials.

5. The system of claim 3, wherein the source segregated stream comprises recycling residue.

6. The system of claim 1, wherein the waste constituents of the first type comprise materials including one of high density polyethylene, low density polyethylene, and polyethylene terephthalate.

7. The system of claim 6, wherein the waste constituents of the second type differ from that of the first type and comprise materials including one of fibers, paper, newsprint, and wood.

8. The system of claim 1, wherein the waste constituents of the first type are differentiated from the waste constituents of the second type based on at least one of the carbon, hydrogen, oxygen, sulfur, nitrogen, chlorine, and ash content of the waste constituents.

9. The system of claim 1, the separation system including an optical sorter for collecting data pertaining to at least one of a volume and a weight of at least one of the waste constituents of the first type and the waste constituents of the second type.

10. The system of claim 9, wherein the data is certified for use by a third party.

11. The system of claim 1, further comprising a blending system for combining at least the waste constituents of the first type and the waste constituents of the second type into said blended feed stock.

12. The system of claim 11, the blending system including an optical sorter for collecting data pertaining to at least one of a volume and a weight of at least one of the waste constituents of the first type and the waste constituents of the second type combined into said blended feed stock.

13. The system of claim 12, wherein the data is certified for use by a third party.

14. A method, comprising:
providing a first bunker;
providing a second bunker;
separating waste constituents of a solid waste stream including separating plastics from fiber materials and forming a first type comprising predominately plastics and forming a second type comprising predominately fiber materials;
differentiating between mixed solid waste constituents of the first type and the second type from the solid waste stream based on a moisture content of the waste constituents and based on how the waste constituents affect a total quantity of heat released by a combustion process when the waste constituents of the first and second types are combined into a blended feed stock for conversion in the combustion process;
placing the waste constituents of the first type comprising predominately plastic materials from the solid waste stream into the first bunker;
placing the waste constituents of the second type comprising predominately paper materials from the solid waste stream into the second bunker;
withdrawing a first amount of the waste constituents of the first type from the first bunker at a rate based on a moisture content of the waste constituents of the first type; and
withdrawing a first amount of the waste constituents of the second type from the second bunker at a rate based on a moisture content of the waste constituents of the second type for blending with the first amount of the waste constituents of the first type into the blended feed stock.

15. The method of claim 14, wherein the mixed solid waste stream comprises municipal solid waste.

16. The method of claim 14, wherein the solid waste stream comprises a source segregated stream.

17. The method of claim 16, wherein the source segregated stream comprises recyclable materials.

18. The method of claim 16, wherein the source segregated stream comprises recycling residue.

19. The method of claim 14, further comprising collecting data pertaining to at least one of a volume and weight of at least one of the waste constituents placed into the first bunker and the waste constituents placed into the second bunker.

20. The method of claim 19, wherein the data is certified for use by a third party.

21. The method of claim 14, wherein the waste constituents of the first type comprise materials including one of high density polyethylene, low density polyethylene, and polyethylene terephthalate.

22. The method of claim 21, wherein the waste constituents of the second type differ from that of the first type and comprise materials including one of fibers, paper, and newsprint.

23. The method of claim 14, wherein the waste constituents of the first type are differentiated from the waste constituents of the second type based on at least one of the carbon, hydrogen, oxygen, sulfur, nitrogen, chlorine, and ash content of the waste constituents.

24. The method of claim 14, further comprising blending waste constituents of the first type with waste constituents of the second type to form the blended feed stock.

25. The method of claim 24, further comprising collecting data pertaining to a chemical composition of the blended waste constituents of the first type and the second type.

26. The method of claim 25, wherein the data is certified for use by a third party.

27. The method of claim 24, further comprising densifying the blended feed stock.

* * * * *